(12) United States Patent
Xia et al.

(10) Patent No.: US 8,054,805 B2
(45) Date of Patent: Nov. 8, 2011

(54) METHOD, APPARATUS AND SYSTEM FOR OBTAINING MIH SERVICE INFORMATION

(75) Inventors: Zhongqi Xia, Shenzhen (CN); Sheng Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 617 days.

(21) Appl. No.: 12/209,761

(22) Filed: Sep. 12, 2008

(65) Prior Publication Data

US 2009/0073937 A1 Mar. 19, 2009

(30) Foreign Application Priority Data

Sep. 14, 2007 (CN) .......................... 2007 1 0153925
Sep. 17, 2007 (CN) .......................... 2007 1 0149851

(51) Int. Cl.
*H04W 36/00* (2009.01)
(52) U.S. Cl. ........................................ 370/331; 455/436
(58) Field of Classification Search .................. 370/331; 455/432.1, 436
See application file for complete search history.

(56) References Cited

U.S. PATENT DOCUMENTS

| | | | |
|---|---|---|---|
| 2007/0061458 A1* | 3/2007 | Lum ............................ | 709/225 |
| 2007/0091846 A1* | 4/2007 | Kim et al. ..................... | 370/331 |
| 2007/0091850 A1* | 4/2007 | Lee et al. ...................... | 370/331 |
| 2007/0173283 A1* | 7/2007 | Livet et al. ................. | 455/552.1 |
| 2007/0183367 A1 | 8/2007 | Park | |

OTHER PUBLICATIONS

European Search Report for European Patent Application No. 08164019.5, dated Dec. 21, 2009.
Bajko, Gabor; "Locating Mobility Servers; draft-bajko-mos-dns-discovery-00.txt"; IETF Standard-Working-Draft; Internet Engineering Task Force; IETF; CH; Aug. 1, 2007; XP015050747; ISSN: 0000-0004; pp. 1-7.
Zuniga, Juan Carlos, et al.; "IEEE 802.21 Media Independent Handover"; Internet Article; [Online]; Jul. 19, 2007; pp. 1-10; XP002513563; Retrieved from the Internet: URL:http://www.ieee802.org/21/doctree/2007_Meeting_Docs/2007-07_meeting_docs/21/07/0275-00-0000-L3-Transport.ppt; [retrieved on Feb. 3, 2009]; pp. 1-10.
Bajko, Gabor; "Dynamic Host Configuration Protocol (DHCPv4 and DHCPv6) Options for Mobility Servers (MoS); draft-bajko-mos-dhcp-options-00.txt"; IETF Standard-Working-Draft; Internet Engineering Task Force; IETF; Ch; Aug. 1, 2007; XP015050746; ISSN: 0000-0004; pp. 1-8.
Melia, T., et al.; "Mobility Services Transport Protocol Design; draft-ietf-mipshop-mstp-solution-00.txt"; IETF Standard-Working-Draft; Internet Engineering Task Force; IETF; CH; vol. mipshop; Dec. 17, 2007; XP015053574; ISSN: 0000-0004; pp. 1-30.
Tsirtsis, G, et al.; "Triggering AAA from DHCP Relay Agents; draft-ietf-dhc-aaa-ra-00.txt"; IETF Standard-Working-Draft; Internet Engineering Task Force; IETF; CH; vol. dhc; Jan. 1, 2001; XP015016861; Issn: 0000-0004; pp. 1-7.
European Search Report for European Application No. 08164019.5, dated Feb. 26, 2009.
Chinese Office Action for Chinese Patent Application No. 200710153925.X, dated Sep. 21, 2010, and partial English translation thereof.

* cited by examiner

*Primary Examiner* — Brian Nguyen

(57) ABSTRACT

A method, an apparatus and a system for obtaining a Media Independent Handover (MIH) service information. The method including: receiving an MIH service information request message from a mobile node; obtaining the MIH service information requested by the mobile node; and sending a response message to the mobile node, with the obtained MIH service information carried in the response message.

19 Claims, 21 Drawing Sheets

METHOD, APPARATUS AND SYSTEM FOR OBTAINING MIH SERVICE INFORMATION

CROSS-REFERENCE TO RELATED APPLICATIONS

This application claims the benefit and priority of Chinese Application No. 200710153925.X, filed Sep. 14, 2007, and Chinese Application No. 200710149851.2, filed Sep. 17, 2007. The entire disclosures of each of the above applications are incorporated herein by reference.

FIELD

The present disclosure relates to the field of communication technologies and to a method, an apparatus and a system for obtaining media independent handover (MIH) service information.

BACKGROUND

This section provides background information related to the present disclosure which is not necessarily prior art.

With the development of wireless communication technologies, networks of different architectures exist at the same time, for example, Wireless LAN (WLAN), Worldwide Interoperability for Microwave Access (WiMAX), and the third Generation Partnership Project (3GPP). To ensure the service continuity when a User Equipment (UE) hands over or roams between heterogeneous networks, the UE usually supports multiple types of wireless interfaces. FIG. 1 is a block diagram of assisting and optimizing the handover service between heterogeneous networks. In FIG. 1, the MIH protocol, for example, Mobile IP (MIP), Session Initiated Protocol (SIP) is located between layer 2 (L2) and layer 3 (L3), and provides the link layer information and other relevant network information to the upper layer for optimizing handover. In this way, the mobile node (UE) can select the best connection network type and the best access point automatically during roaming between networks, and implement seamless handover.

The internal architecture of the MIH service is shown in FIG. 2, and can be split into two layers. The upper layer is an MIH service layer, which provides three types of services: MIH Event Service (MIH ES), MIH Command Service (MIH CS) and MIH Information Service (MIH IS). The MIH ES provides instant transmission for the events below the link layer or below the remote link layer; the MIH CS provides transmission for the commands of changing the underlying layer link state or connection point; and the MIH IS provides transmission for the information related to network topologies and location. The lower layer is a common transport layer of the MIH service, and provides the transmission function for the upper layer. It is set up on the IP layer, now there is no implementation mode of the HIH layer. Instead, the MIH service is discovered.

The MIH service can be used between a mobile node and a network infrastructure, or between different network infrastructures. The network infrastructure may be an MIH server. Before use of the MIH service, it is necessary to get the MIH service-related information (for example, MIH ES, MIH CS, and MIH IS). In the prior art, the MIH service-related information is statically configured inside the mobile node, and may be the MIH service information of the home network of the user or the MIH service information of a third-party network.

Based on research and practices, the disadvantages of the prior art lie in:

the MIH service-related information is statically configured inside the mobile node, and can't be changed randomly. When a mobile node roams to a visited network, the configured MIH service-related information (including MIH ES, MIH CS, and MIH IS) will be provided to the upper layer by the mobile node. The configured MIH service-related information may be different from the MIH service information of the network visited by the mobile node, and the configured MIH service-related information is unchangeable and little extensible. Therefore, it is difficult to implement seamless handover of a mobile node between networks of the same or different types; and the MIH service-related information is statically configured inside a mobile node. With the development of the wireless communication technology and the increase of mobile nodes, it is a heavy workload to configure MIH service-related information for every mobile node.

SUMMARY

This section provides a general summary of the disclosure, and is not a comprehensive disclosure of its full scope or all of its features.

An aspect provides a method for obtaining MIH service information, the method include: receiving, an MIH service information request message from a mobile node, where the MIH service information request message carries an MIH service request flag; obtaining, MIH service information according to the MIH service request flag; sending, a response message to the mobile node, wherein the response message carries the obtained MIH service information.

Another aspect provides an apparatus for obtaining MIH service information, the apparatus includes: a request receiving module adapted to receive, from the mobile node, a media independent handover (MIH) service information request message with an MIH service request flag; a information obtaining module adapted to obtain, the MIH service information requested by the mobile node according to MIH service request flag; and an information sending module adapted to send, a response message with the obtained MIN service information to the mobile node.

Another aspect provides a system for obtaining MIH service information. The system includes: a mobile node and a DHCP server, the DHCP server is adapted to receive the MIH service information request message sent by the mobile node, obtain the MIH service information requested by the mobile node, and send obtained MIH service information to the mobile node. In an embodiment, the DHCP server obtains the MIH service information requested by the mobile node according to an MIH service request flag in the MIH service information request message. The system further includes a relay server adapted to receive the MIH service information request message sent by the mobile node, insert the MIH service information of the home network of the mobile node into the MIH service information request message and send the MIH service information request message to the DHCP server.

The embodiments obtain the MIH service information requested by a mobile node after receiving an MIH service information request message from the mobile node; and send the obtained MIH service information to the mobile node, so that the mobile node can dynamically obtain the MIH service information after the mobile node roams to a visited network and needs to request for MIH service information. The obtained MIH service information includes the MIH service information of the network visited by the mobile node. The obtained MIH service information is changeable and highly extensible, which helps seamless handover of a mobile node between networks of the same or different types.

According to the various embodiments, the MIH service information may be obtained dynamically without configuring MIH service-related information manually, thus avoiding the heavy work involved in manual configuration of the MIH service-related information.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 16A:
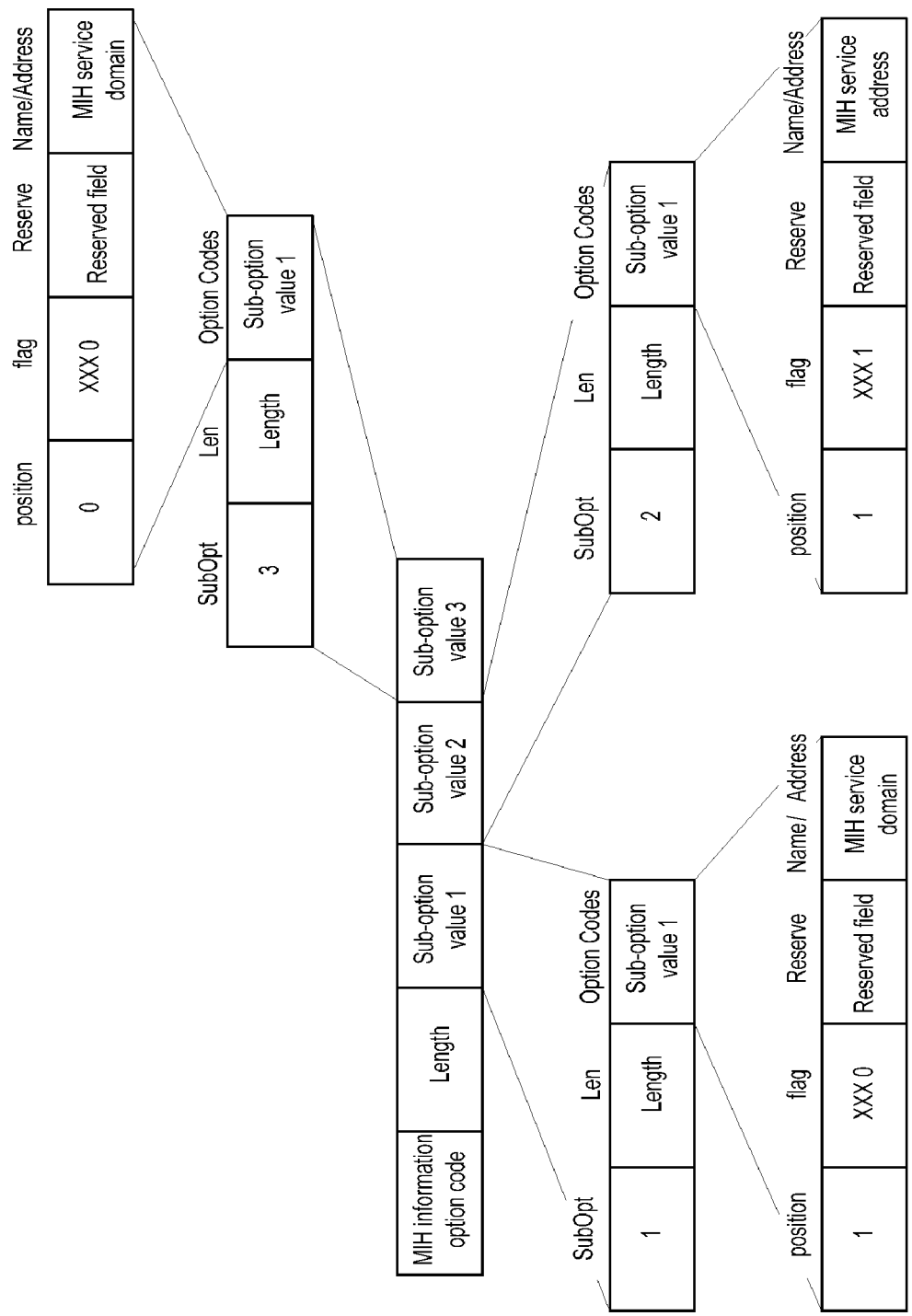
Figure 16B:
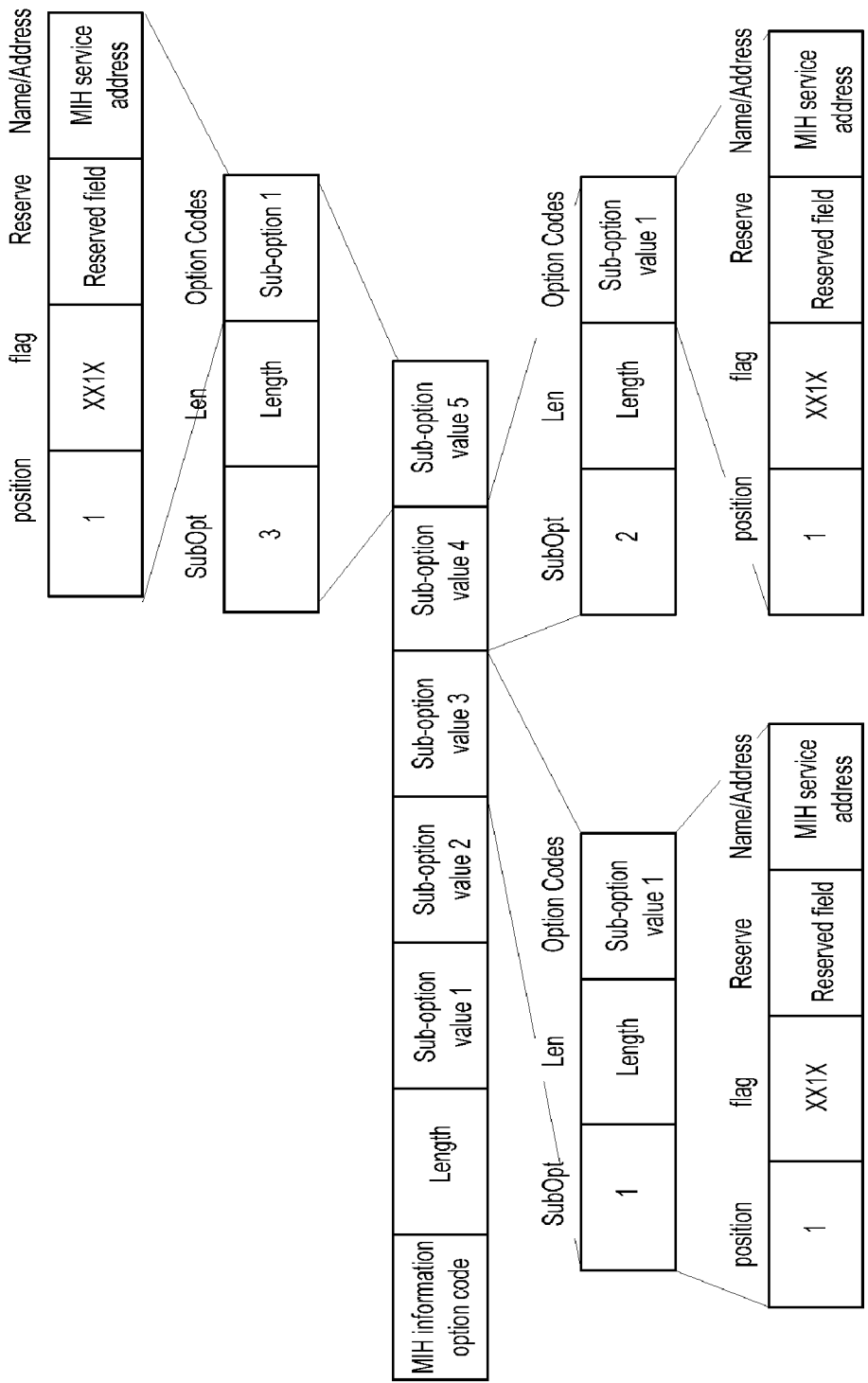
Figure 16C:
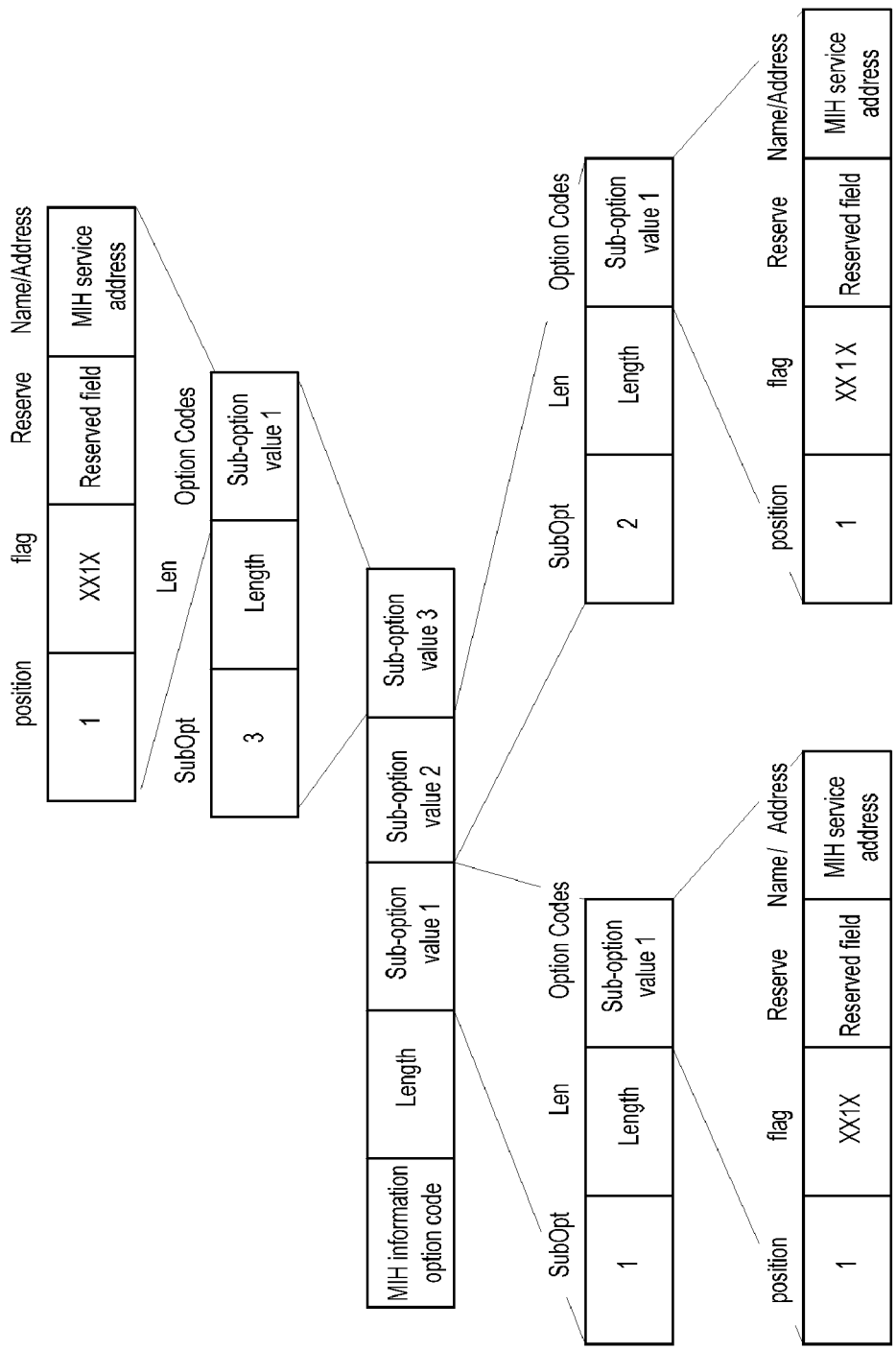
Figure 17:
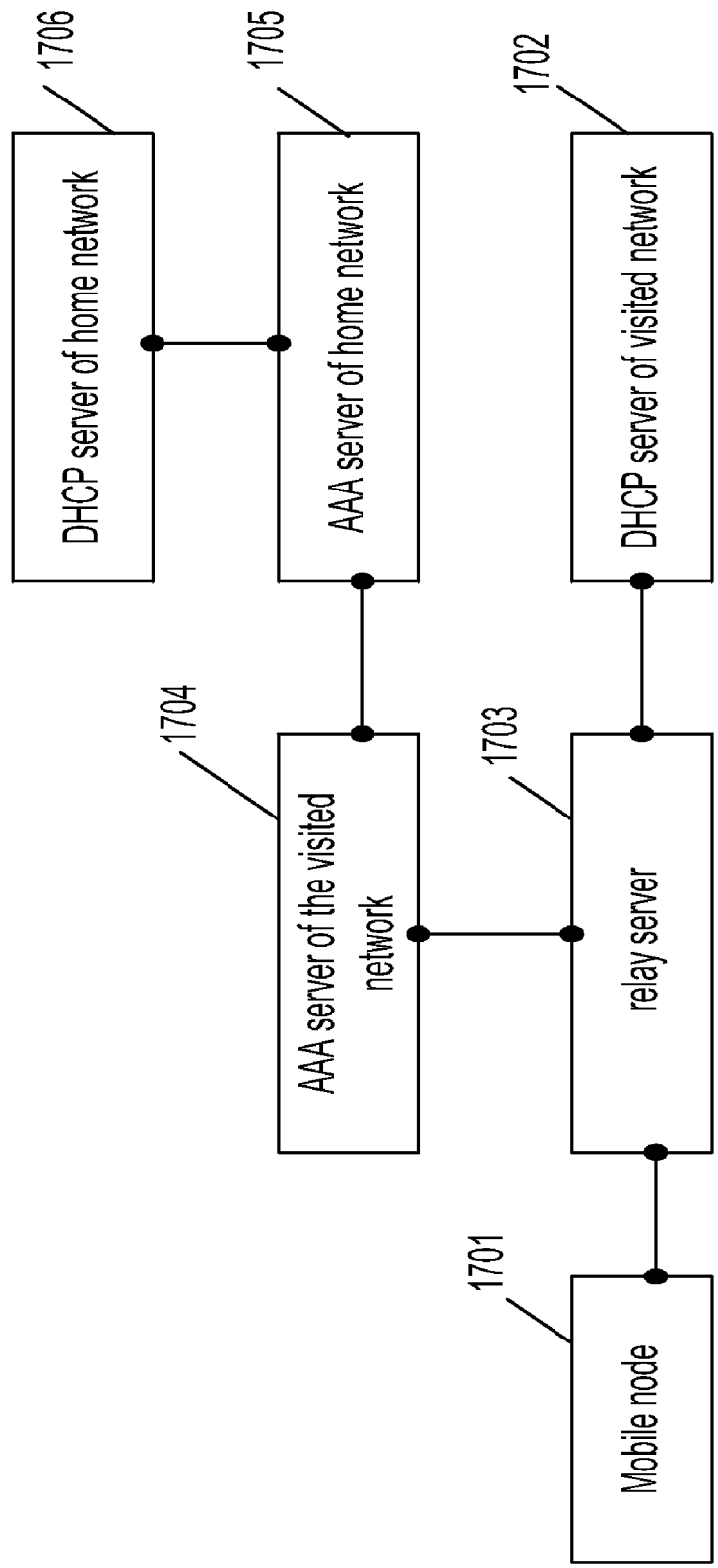
Figure 18:
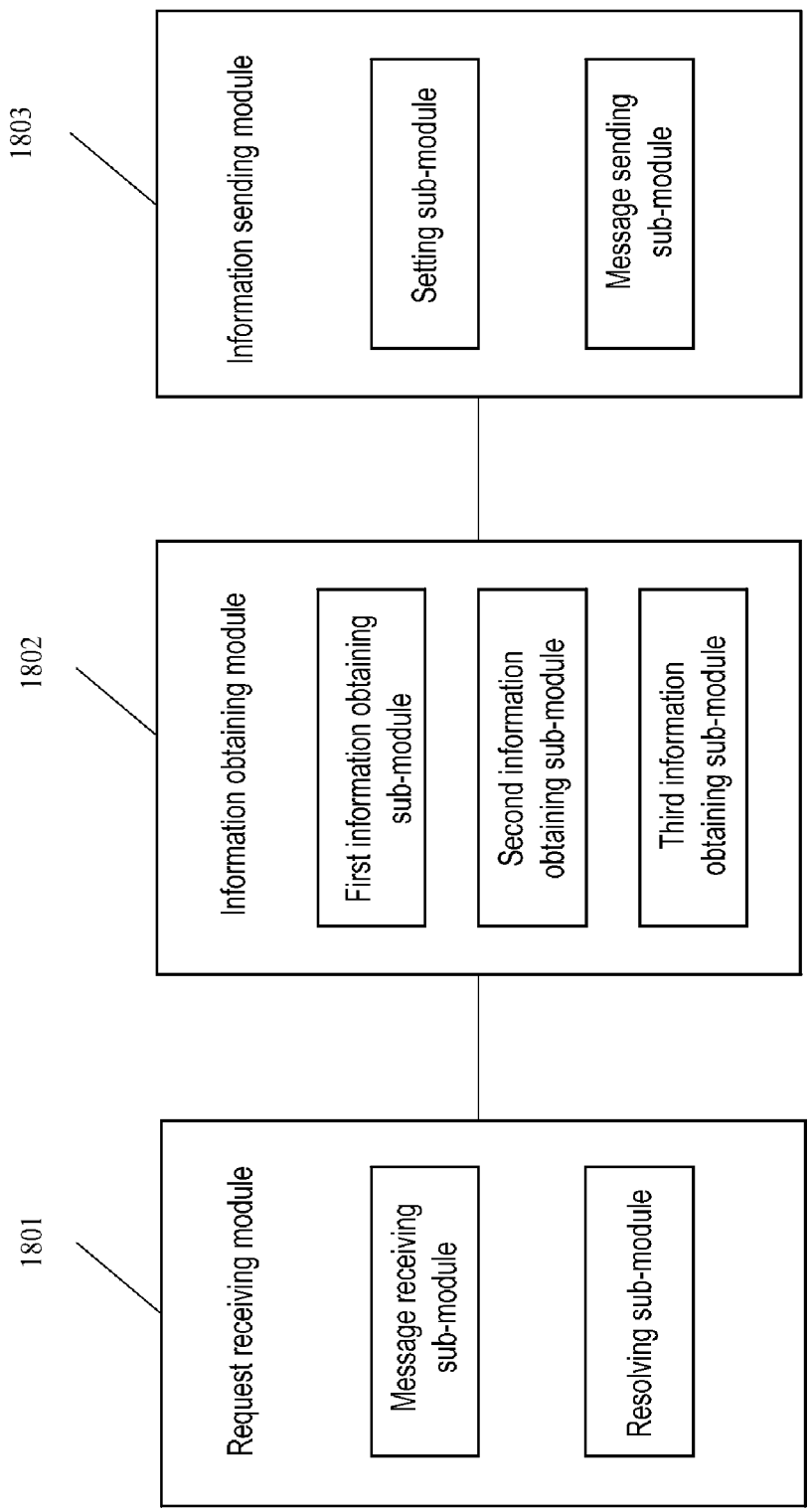

FIG. 16a, to FIG. 16c show the MIH information options according to another embodiment in DHCPv4;

FIG. 17 shows the architecture of a network system according to an embodiment; and FIG. 18 shows the architecture of a DHCP server according to an embodiment.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The embodiments provide a method for obtaining MIH service information, including: receiving a media independent handover (MIH) service information request message from a mobile node, wherein the MIH service information request message carries an MIH service request flag; obtaining MIH service information according to the MIH service request flag; sending a response message to the mobile node, wherein the response message carries the obtained MIH service information. The MIH service request flag is used to indicate that the purpose of the message is to get MIH service information. In this way, a mobile node can obtain the MIH service information dynamically when roaming to a visited network and flexibly get the MIH service specified.

Figure 1:
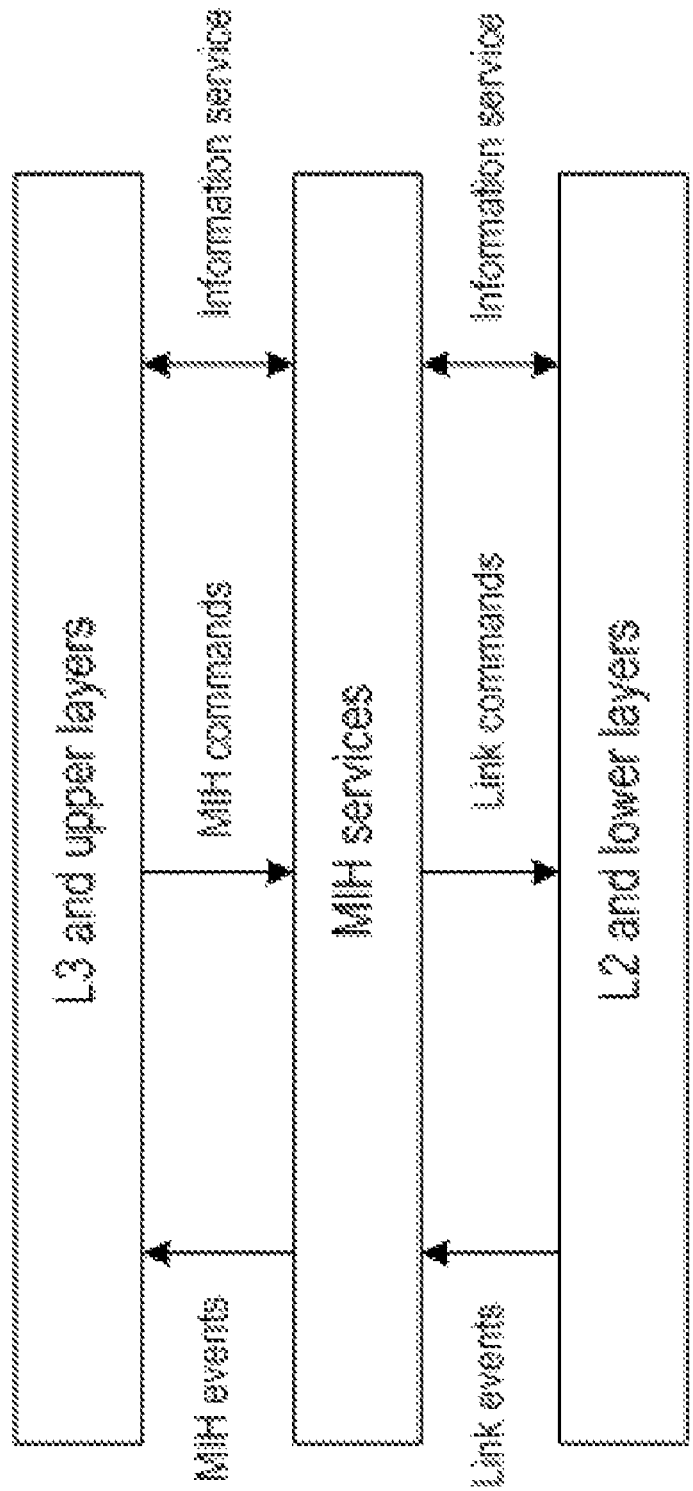
FIG. 1 shows the architecture for assisting and optimizing the handover between heterogeneous networks according to the prior art.
Figure 2:
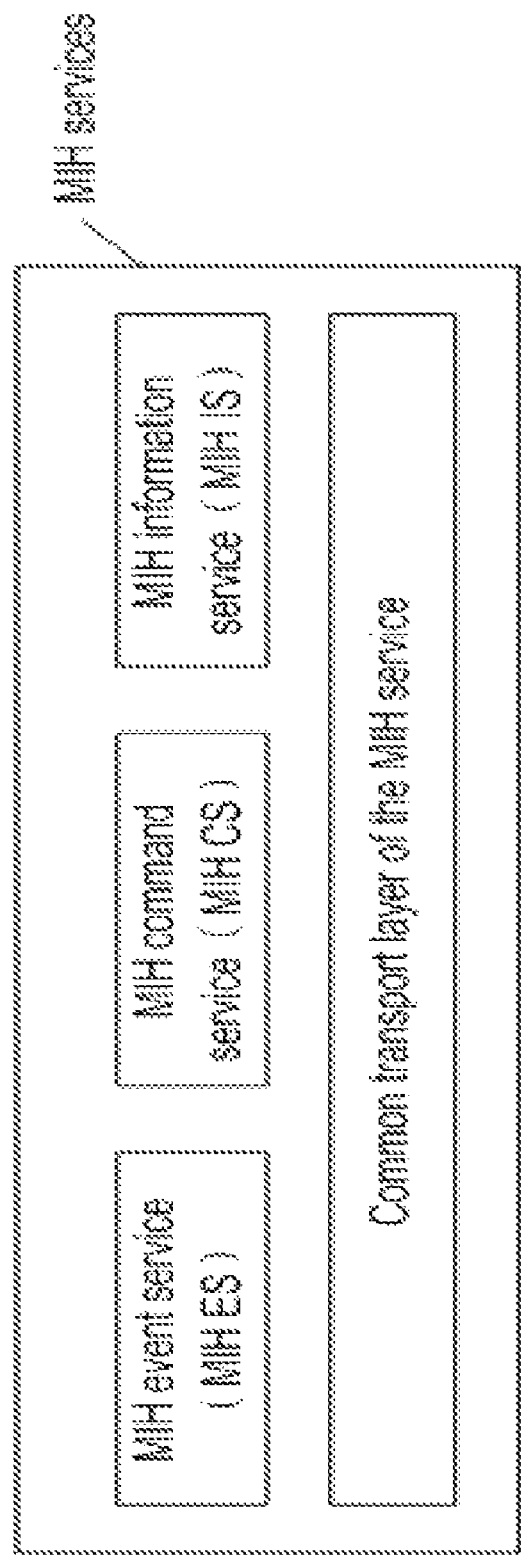
FIG. 2 shows the architecture of the MIH service function according to the prior art.
Figure 3:
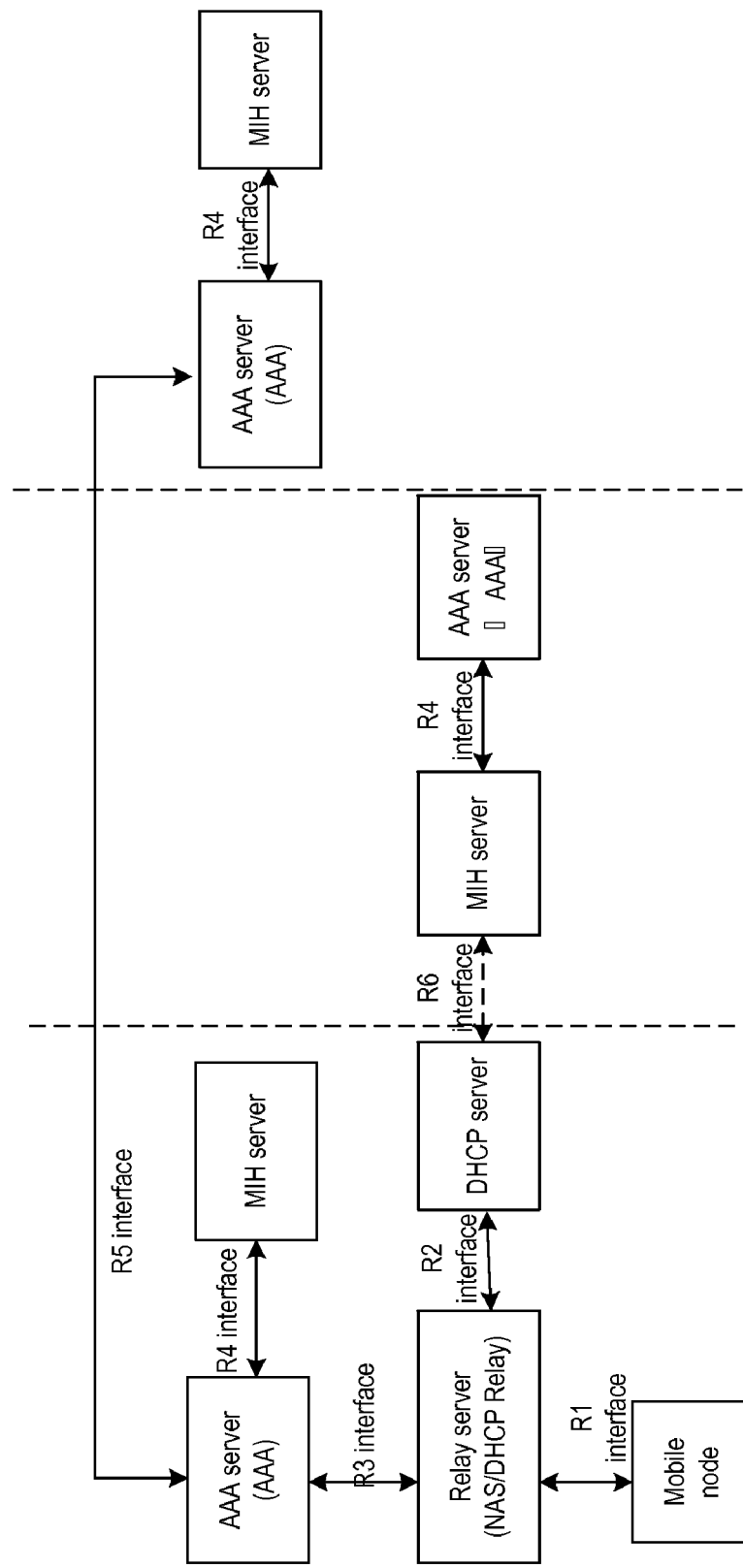
FIG. 3 shows the architecture of obtaining MIH service information according to an embodiment.

FIG. 3 shows the architecture of obtaining MIH service information according to an embodiment, and illustrates how the MIH service is connected with the visited network, the home network and the third-party network. In FIG. 3, four types of logical function entities and six types of service interfaces are applied.

The four types of logical function entities are:
MIH server;
Authentication Authorization Accounting (AAA) server;
Network Access Server (NAS, also act as a relay); and
Dynamic Host Configuration Protocol (DHCP) server.

The six types of service interfaces are described below:

R1 interface, an interface between the mobile node and the relay server, wherein the relay server may be a NAS server or a DHCP Relay server, adapted to bear management and control signaling and data services;

R2 interface, an interface between the NAS server/DHCP Relay server and the DHCP server, adapted to bear DHCP management signaling;

R3 interface, an interface between the NAS server/DHCP Relay server and the AAA server, adapted to bear admission control signaling;

R4 interface, an interface between the AAA server and the MIH server, adapted to bear MIH service admission control signaling;

R5 interface, an interface between the mobile node's MA server of the visited network and AAA server of the home network, adapted to bear remote access control signaling; and R6 interface, a virtual interface, bearing no actual signaling and statically configuring the MIH service information of a third-party network to the DHCP server of the visited network.

Figure 4:
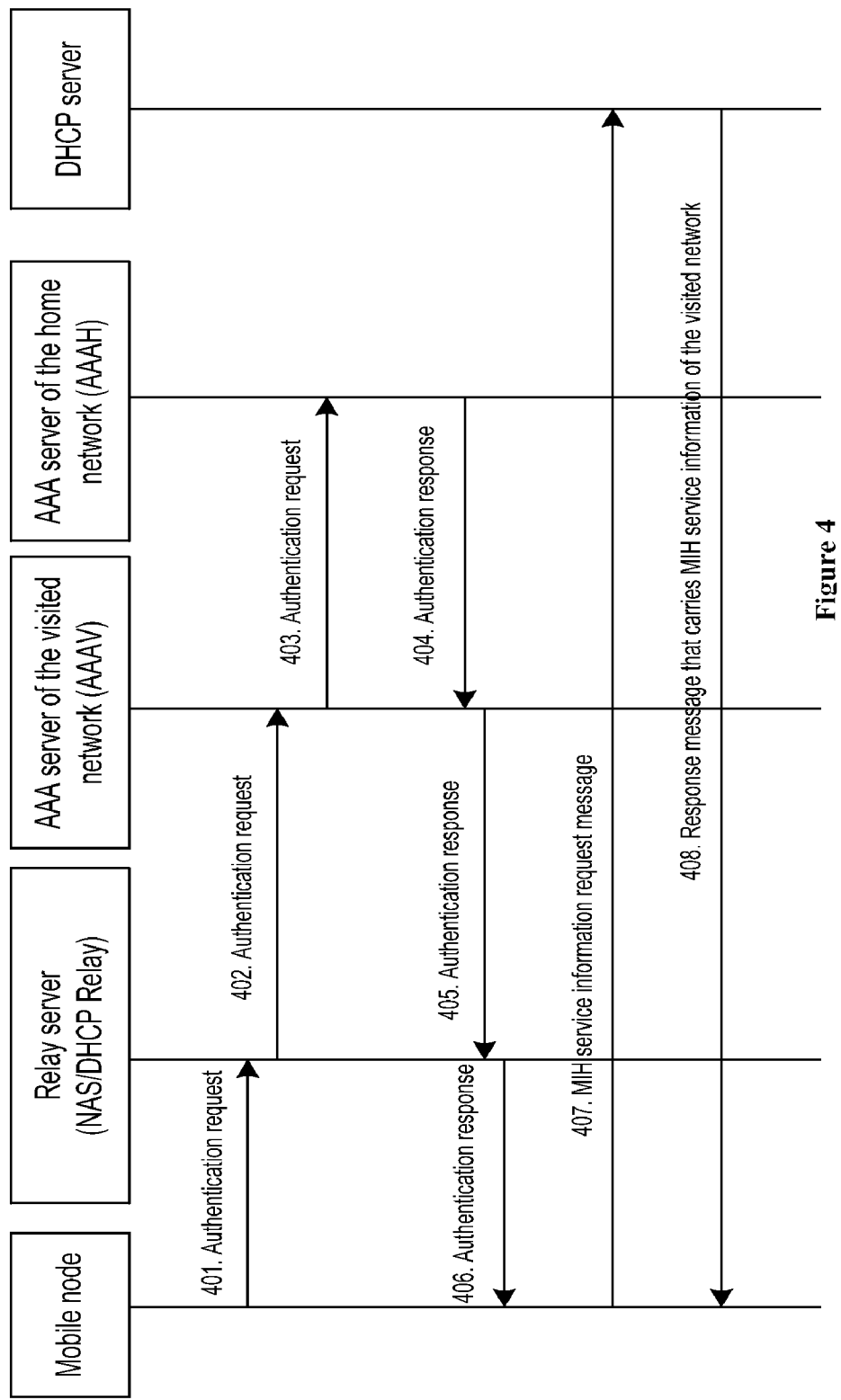
FIG. 4 is a flowchart of the method for obtaining MIH service information according to the first embodiment in DHCPv6.

As shown in FIG. 4 in conjunction with FIG. 3, the embodiments provide a method for obtaining MIH service information in DHCPv6, wherein the mobile node sends an MIH service information request message to the DHCP server, with an MIH service request flag carried in the message; and the DHCP server returns the MIH service information of the visited network of mobile node. The method includes the following described hereinafter.

401: The mobile node sends an authentication request to the NAS server/DHCP Relay.

402: The NAS server/DHCP Relay sends the authentication request to the AAA server of the visited network (AAAV).

403: The AAA server of the visited network (AAAV) sends the authentication request to the MA server of the home network (AAAH).

The previous authentication requests include a subscription ID.

404: The MA server of the home network (AAAH) authenticates the user according to the subscription ID, and returns an authentication response to the AAA server of the visited network (AAAV) after authenticates successfully.

405: The AAA server of the visited network (AAAV) returns the authentication response to the NAS server/DHCP Relay.

406: The NAS server/DHCP Relay returns the authentication response to the mobile node.

407: After receiving the authentication response, the mobile node sends an MIH service information request message to the DHCP server, with the subscription ID carried in the MIH service information request message.

408: The DHCP server obtains the MIH service information of the visited home, sends a response message to the mobile node, with the MIH service information obtained.

In 407, the MIH service information request message is a DHCP REQUEST. Upon receiving the DHCP REQUEST, the DHCP server will return the MIH service information of the visited network to the mobile node. The DHCP REQUEST may carry an MIH service request flag to indicate that the DHCP REQUEST requests for MIH service information.

The DHCP server in the first embodiment may be a DHCPv4 server or a DHCPv6 server. Items 407 and 408 in the first embodiment may be implemented though the two-message switching mode or four-message switching mode supported by the existing DHCPv6 protocol, or though the four-message switching mode supported by the DHCPv4 protocol.

In the case of two-message switching supported by the DHCPv6 protocol, two switching modes are applicable: (1) in 407, the MIH service information request message is a DHCP REQUEST; in 408, the response message that carries the MIH service information of the visited network is a DHCP REPLY; (2) in 407, the MIH service information request message is a DHCP SOLICIT that carries the Rapid Commit Option; in 408, the response message that carries the MIH service information of the visited network is DHCP REPLY. The Rapid Commit Option is adapted to notify the DHCP server to send a DHCP REPLY message immediately instead of a DHCP ADVERTISE.

In the case of four-message switching supported by the DHCPv6 protocol: in 407, the MIH service information request message is a DHCP SOLICIT; in 408, the response message that carries the MIH service information of the visited network is a DHCP ADVERTISE. In this case, the method further includes two messages: (i) After determining that the received MIH service information is available, the mobile node sends a DHCP REQUEST to the DHCP server, indicating that the received MIH service information is available; and (ii) the DHCP server sends a DHCP REPLY to the mobile node.

When the DHCP REQUEST carries the MIH service request flag, the DHCPv6 protocol needs to be extended in this way: In the two-message switching mode, the MIH service request flag is added into the DHCP REQUEST and the DHCP SOLICIT, and the MIH service information of the visited network is added into the DHCP REPLY; in the four-message switching mode, the MIH service request flag is added into the DHCP SOLICIT, and the MIH service information of the visited network is added into the DHCP ADVERTISE.

Figure 5:
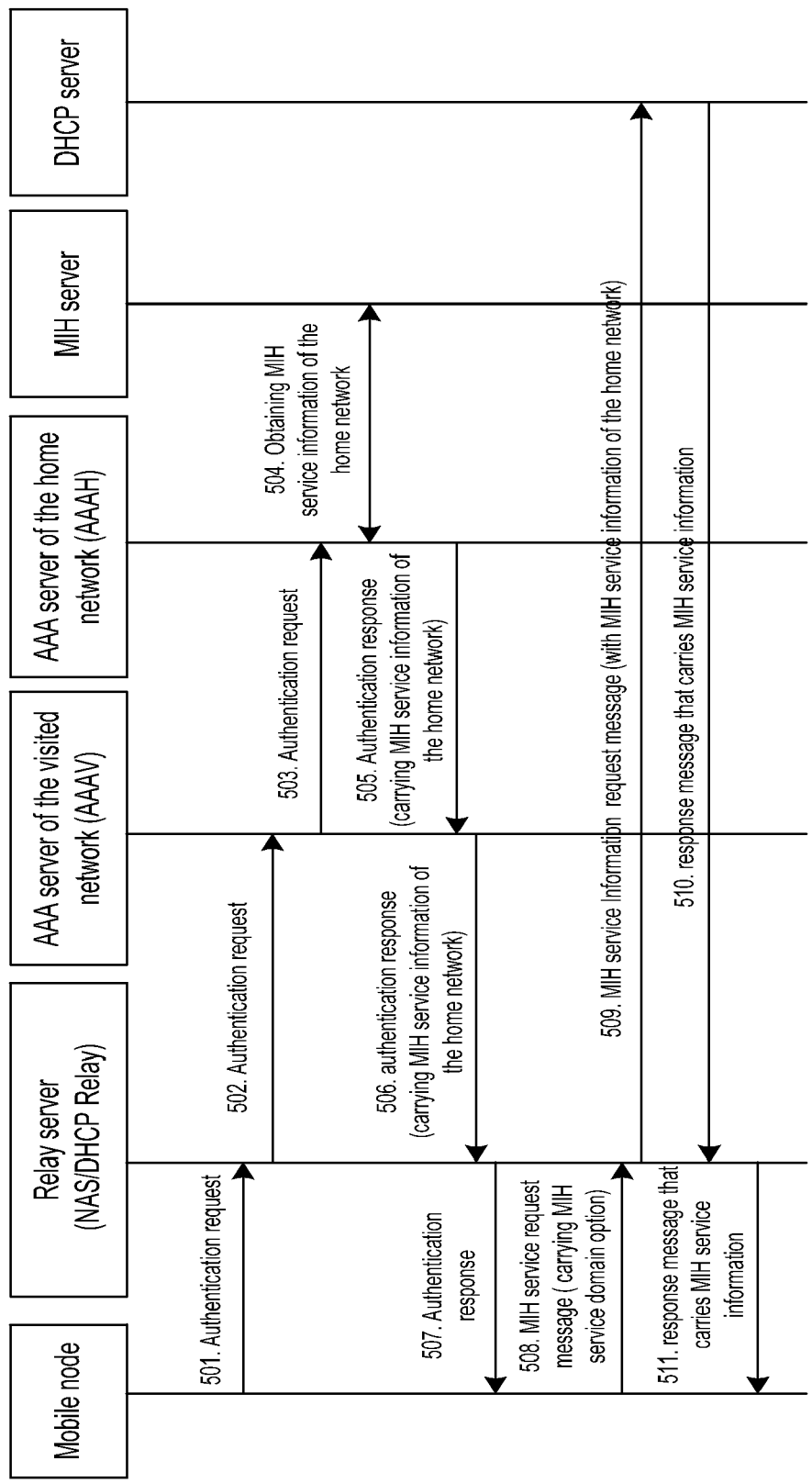
FIG. 5 is a flowchart of the method for obtaining MIH service information according to the second embodiment in DHCPv6.

As shown in FIG. 5 in conjunction with FIG. 3, a method for obtaining MIH service information according to the second embodiment in DHCPv6 includes the following described hereinafter.

501: A mobile node sends an authentication request to an NAS server/DHCP Relay.

502: The NAS server/DHCP Relay sends the authentication request to the AAA server of the visited network (AAAV).

503: The AAA server of the visited network (AAAV) sends the authentication request to the MA server of the home network (AAAH).

The previous authentication requests include a subscription ID.

504: The AAA server of the home network (AAAH) obtains the MIH service information of the home network of the mobile node from the MIH server according to the subscription ID.

In 504: The MIH server obtaining the MIH service information of the home network, the MIH service information includes the MIH CS of the home network, MIH ES and MIH IS.

505: The AAA server of the home network (AAAH) returns an authentication response to the AAA server of the visited network (AAAV), with the MIH service information of the home network carried in the response.

506: The AAA server of the visited network (AAAV) returns an authentication response to the NAS server/DHCP Relay, with the MIH service information of the home network carried in the response.

507: The NAS server/DHCP Relay returns an authentication response to the mobile node.

508: After receiving the authentication response, the mobile node sends an MIH service request message to the NAS server/DHCP Relay. The MIH service information request message carries the MIH service request flag, the MIH service domain option and the subscription ID.

In 508, the MIH service information request message does not necessarily carry the MIH service request flag.

509: After receiving the MIH service information request message, the NAS server/DHCP Relay inserts the MIH service information of the home network of the mobile node into the MIH service information request message according to the subscription ID, and forwards the MIH service information request message to the DHCP server.

510: After receiving the MIH service information request message, the DHCP server finds that the mobile node needs to obtain the MIH service information according to the MIH service request flag and the subscription ID, and hence retrieves the MIH service information of the network indicated by the MIH service domain option and sends a response message to the NAS server/DHCP Relay, with the MIH service information carried in the message.

In 510, if the visited network is selected by the MIH service domain options, the DHCP server will return the MIH service information of the visited network to the NAS server/DHCP Relay. The MIH service information of the visited network includes the MIH service domain name or IP address of the visited network. If the home network is selected by the MIH service domain options, the DHCP server will return the MIH service information of the home network to the NAS server/DHCP Relay. The MIH service information of the home network includes the MIH service domain name or IP address of the home network. If a third-party network is selected by the MIH service domain options, the DHCP server will return the MIH service information of the third-party network to the NAS server/DHCP Relay. The MIH service information of the third-party network includes the MIH service domain name or IP address of the third-party network.

In 510, the MIH service domain options may include: MIH service information of the home network, MIH service information of the visited network, or MIH service information of a third-party network. The MIH service information of more than one network can be selected. In 510, the MIH service information of the visited network is generally selected by the MIH service domain options.

511: The NAS server/DHCP Relay sends a response message to the mobile node, with the MIH service information carried in the message.

In the second embodiment, in the process of authenticating the user, the AAA server of the visited network does not necessarily obtain the MIH service information of the home network of the user, and does not necessarily carry the MIH service information of the home network of the user in the authentication response. Instead, before sending an MIH service information request message, the mobile node preset the MIH service information of the home network of the user to the DHCP server, so that the DHCP server can obtain the MIH service information requested by the mobile node according to the MIH service domain options carried in the MIH service information request message. In this case, the MIH service information request message sent by the mobile node to the DHCP server and the response message that carries MIH service information sent by the DHCP server to the mobile node do not necessarily pass through the NAS server/DHCP Relay, which does not affect fulfillment of the purposes under the present disclosure.

The previous process of the method for obtaining MIH service information can be implemented by extending the two-message switching modes supported by the DHCPv6 protocol. The two-message switching comes in two modes.

Figure 6:
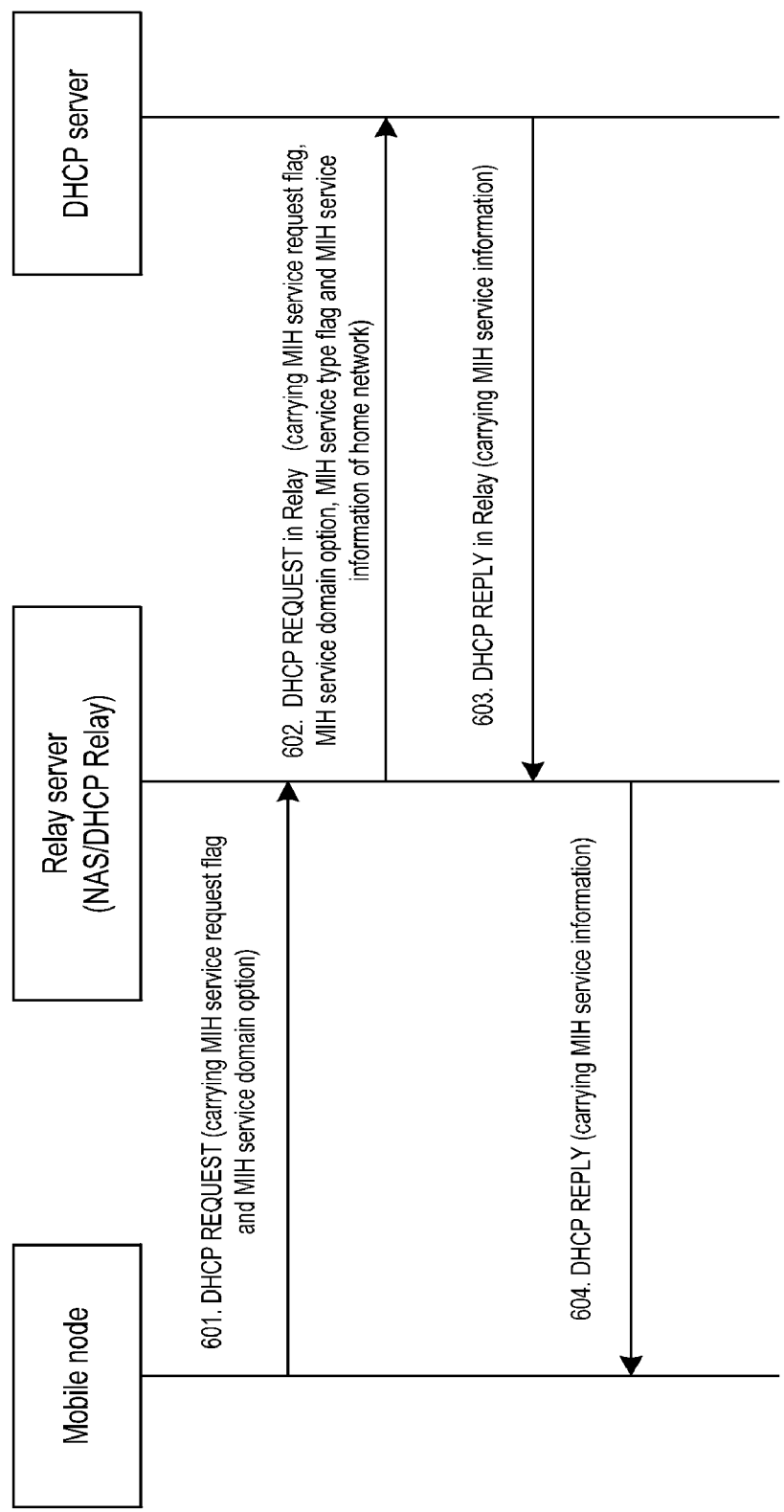
FIG. 6 is a flowchart of the method for obtaining MIH service information in the two-message switching mode according to an embodiment in DHCPv6.
Figure 7:
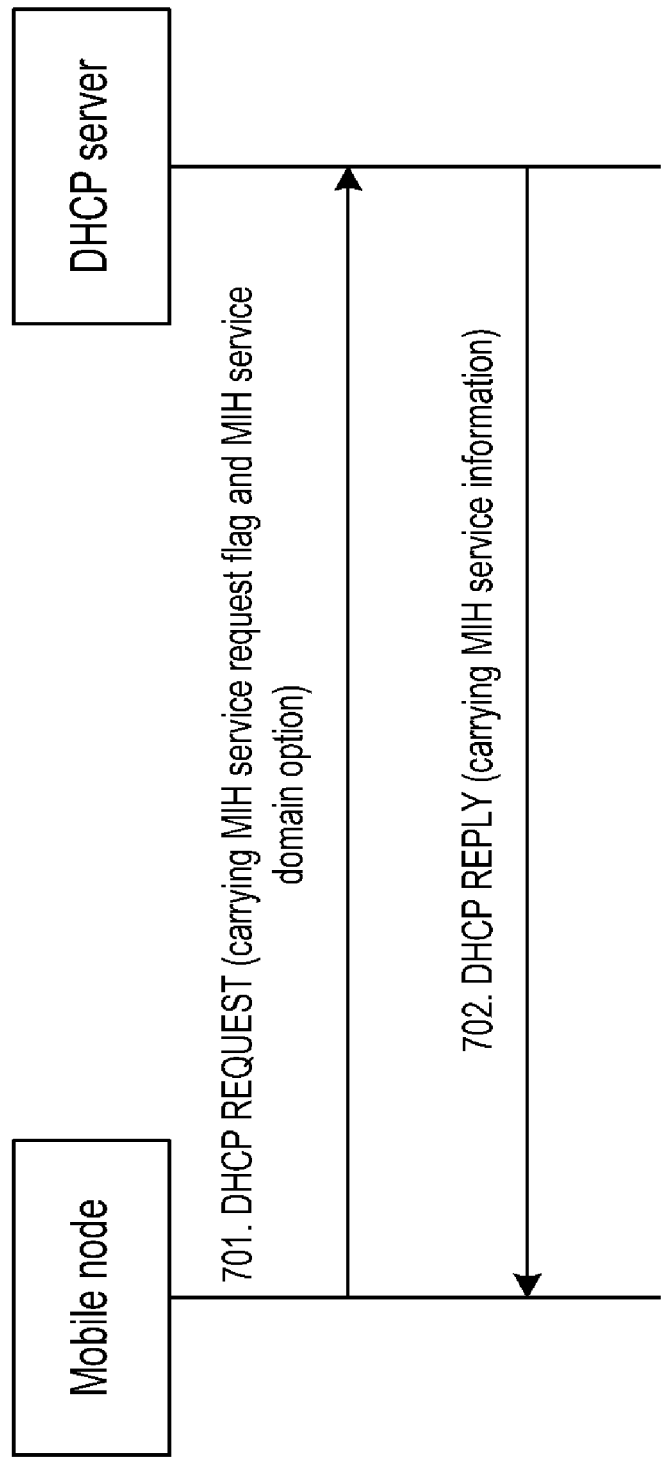
FIG. 7 is a flowchart of the method for obtaining MIH service information in the two-message switching mode according to an embodiment in DHCPv6.

For the first switching mode that involves the DHCP REQUEST and DHCP REPLY, in the first embodiment, an MIH service request flag can be added into the DHCP REQUEST, and the MIH service information of the visited network can be added into the DHCP REPLY. In the second embodiment, the MIH service request flag and the MIH service domain options are added into the DHCP REQUEST, and the MIH service information of the network selected by the MIH service domain options is added into the DHCP REPLY, as illustrated in FIG. 6 and FIG. 7. The DHCP REQUEST and the DHCP REPLY may pass through the NAS server/DHCP Relay, and the NAS server/DHCP Relay will insert the MIH service information of the home network into the DHCP REQUEST sent to the DHCP server; alternatively, the two messages do not pass through the NAS server/DHCP Relay, and the DHCP server will preset the MIH service information of the home network. FIG. 6 is a flowchart of the method for obtaining MIH service information when two messages pass through the NAS server/DHCP Relay in the two-message switching mode. FIG. 7 is a flowchart of the method for obtaining MIH service information when two messages do not pass through the NAS server/DHCP Relay in the two-message switching mode.

As shown in FIG. 6, the method for obtaining MIH service information in the two-message switching mode includes the following described hereinafter.

601: The mobile node sends a DHCP REQUEST to the NAS server/DHCP Relay. The DCP REQUEST carries a MIH service request flag, an MIH service domain option, an MIH service type flag and a subscription ID.

602: After receiving the DHCP REQUEST, the NAS server/DHCP Relay inserts the MIH service information of the home network into the DHCP REQUEST, get the message "DHCP REQUEST in Relay", and sends the "DHCP REQUEST in Relay" message to the DHCP server.

603: The DHCP server finds that the mobile node needs to obtain the MIH service information according to the MIH service request flag and the subscription ID, and hence retrieves the MIH service information of the network selected by the MIH service domain option of type indicated by the MIH service type flag and sends a response message "DHCP REPLY in Relay" to the NAS server/DHCP Relay, with the MIH service information carried in the DHCP REPLY.

604: The NAS server/DHCP Relay sends a DHCP REPLY to the mobile node, with the MIH service information carried in the DHCP REPLY.

As shown in FIG. 7, the method for obtaining MIH service information in the two-message switching mode includes the following described hereinafter.

701: The mobile node sends a DHCP REQUEST to the DHCP server. The DHCP REQUEST carries the MIH service request flag, the MIH service domain options and the subscription ID.

702: The DHCP server finds that the mobile node needs to obtain the MIH service information according to the MIH service request flag and the subscription ID, and hence retrieves the MIH service information of the network selected by the MIH service domain options and sends a response message "DHCP REPLY" to the mobile node, with the MIH service information carried in the DHCP REPLY.

Figure 8:
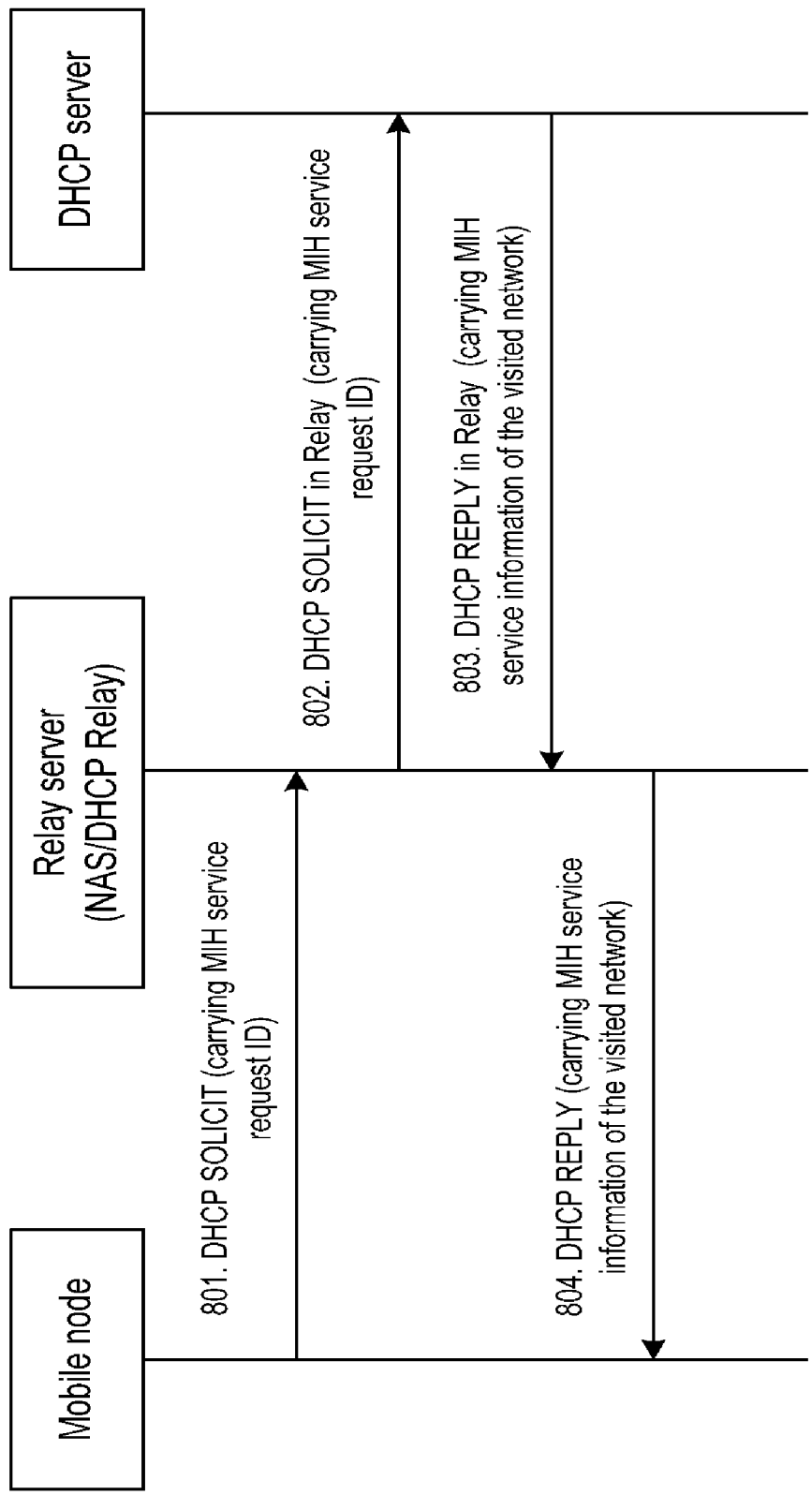
FIG. 8 is a flowchart of the method for obtaining MIH service information in the two-message switching mode according to an embodiment in DHCPv6.
Figure 9:
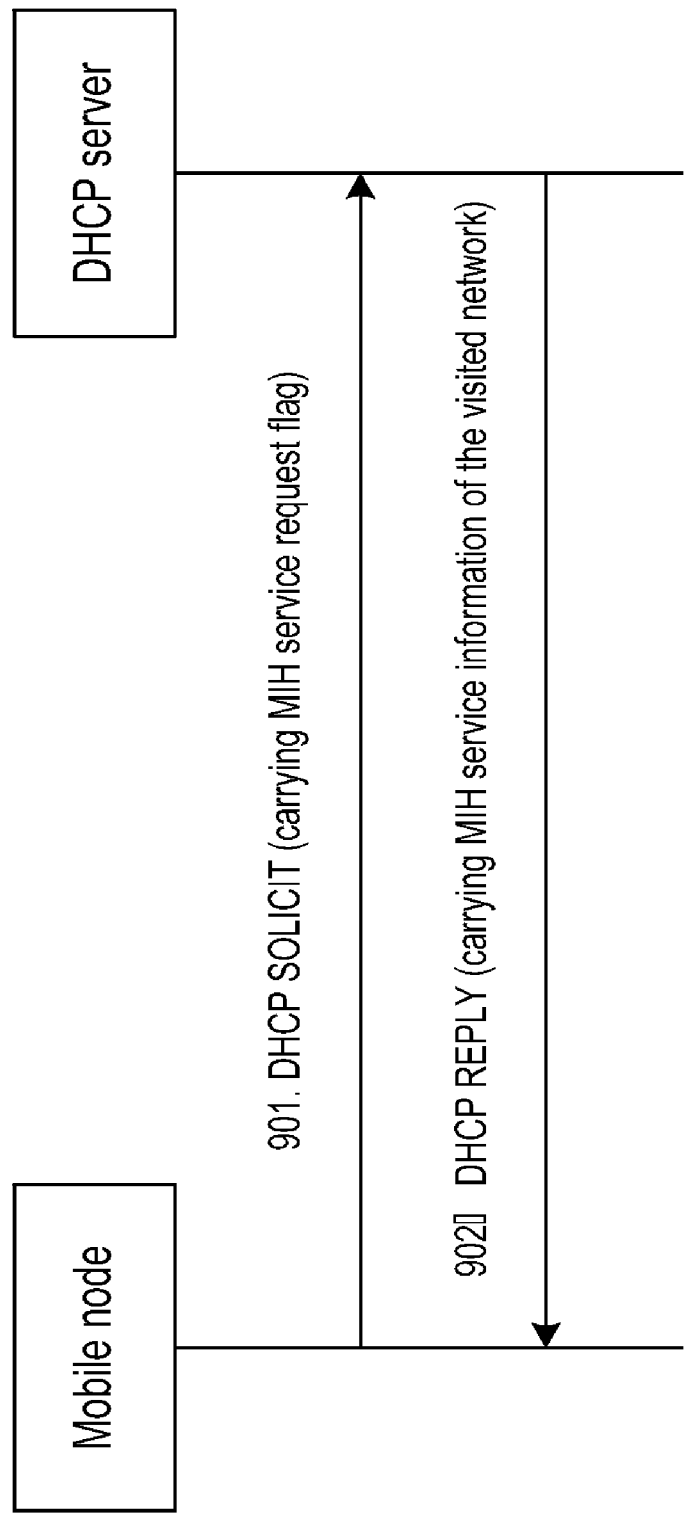
FIG. 9 is a flowchart of the method for obtaining MIH service information in the two-message switching mode according to an embodiment in DHCPv6.

FIG. 8 and FIG. 9 show the second switching mode of the extended two-message switching. In the second switching mode, the DHCP SOLICIT and the DHCP REPLY may pass through the NAS server/DHCP Relay or not; the MIH service request flag is added into the DHCP SOLICIT, and the MIH service information of the visited network is added into the DHCP REPLY.

As shown in FIG. 8, the method for obtaining MIH service information in the two-message switching mode includes the following described hereinafter.

801: The mobile node sends a DHCP SOLICIT to the NAS server/DHCP Relay. The DHCP SOLICIT carries the MIH service request flag, Rapid Commit Option, and subscription ID.

In 801, the Rapid Commit Option is adapted to notify the DHCP server to send a DHCPREPLY immediately, instead of a DHCP ADVERTISE.

802: After receiving the DHCP SOLICIT, the NAS server/DHCP Relay renames the message to "DHCP SOLICIT in Relay", and sends the "DHCP SOLICIT in Relay" to the DHCP server.

803: The DHCP server retrieves the MIH service information of the visited network of the mobile node according to the MIH service request flag and the subscription ID, and sends a response message "DHCPREPLY in Relay" to the NAS server/DHCP Relay, with the MIH service information of the visited network carried in the message.

804: The NAS server/DHCP Relay sends a DHCP REPLY to the mobile node, with the MIH service information of the visited network carried in the DHCP REPLY.

As shown in FIG. 9, the method for obtaining MIH service information in the two-message switching mode includes the following described hereinafter.

901: The mobile node sends a DHCP SOLICIT to the DHCP server. The DHCP SOLICIT carries the MIH service request flag, Rapid Commit Option, and subscription ID.

902: The DHCP server retrieves the MIH service information of the visited network of the mobile node according to the MIH service request flag and the subscription ID, and sends a response message "DHCP REPLY" to the mobile node, with the MIH service information of the visited network carried in the message.

Figure 10:
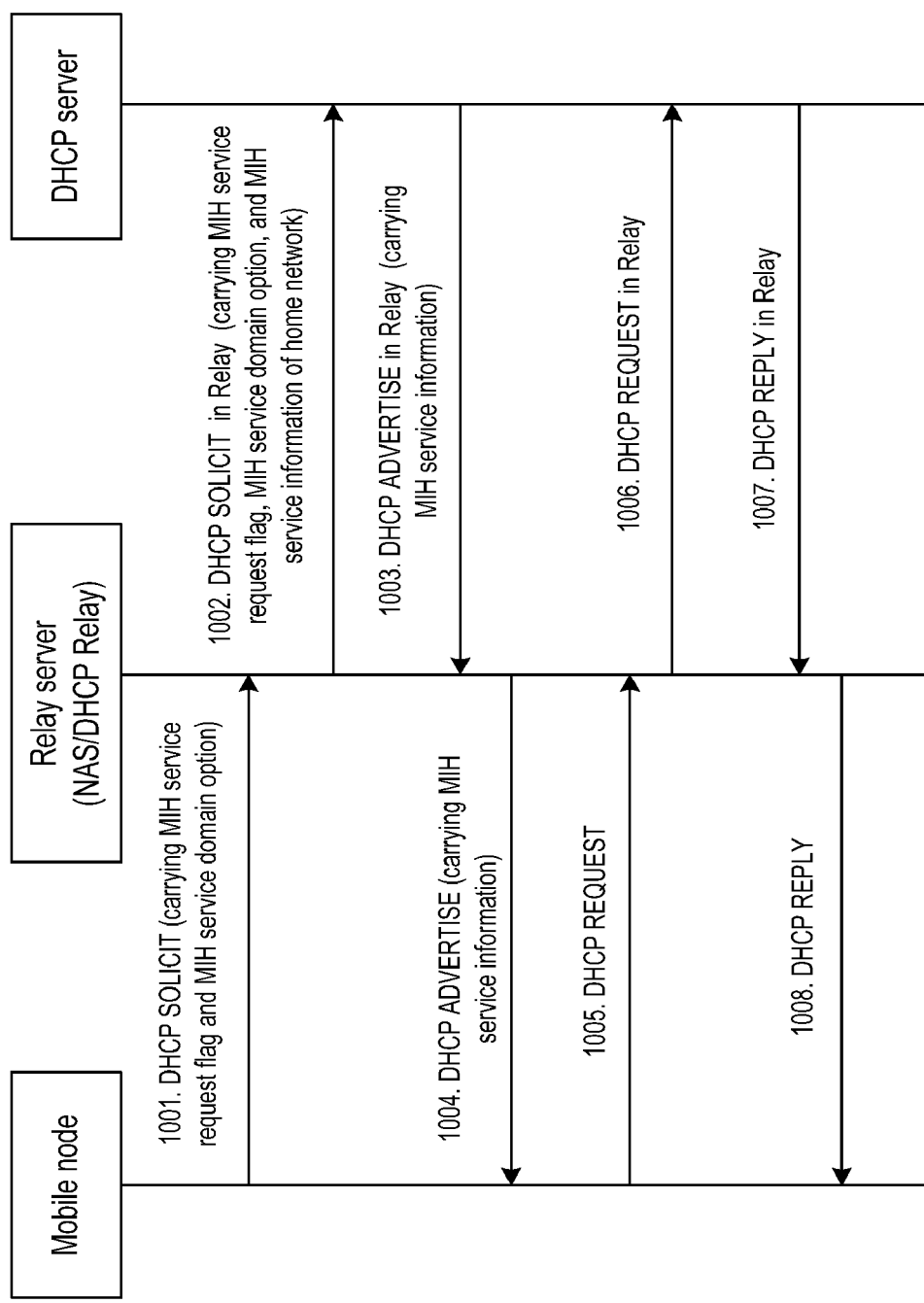
FIG. 10 is a flowchart of the method for obtaining MIH service information in the four-message switching mode according to an embodiment in DHCPv6.
Figure 11:
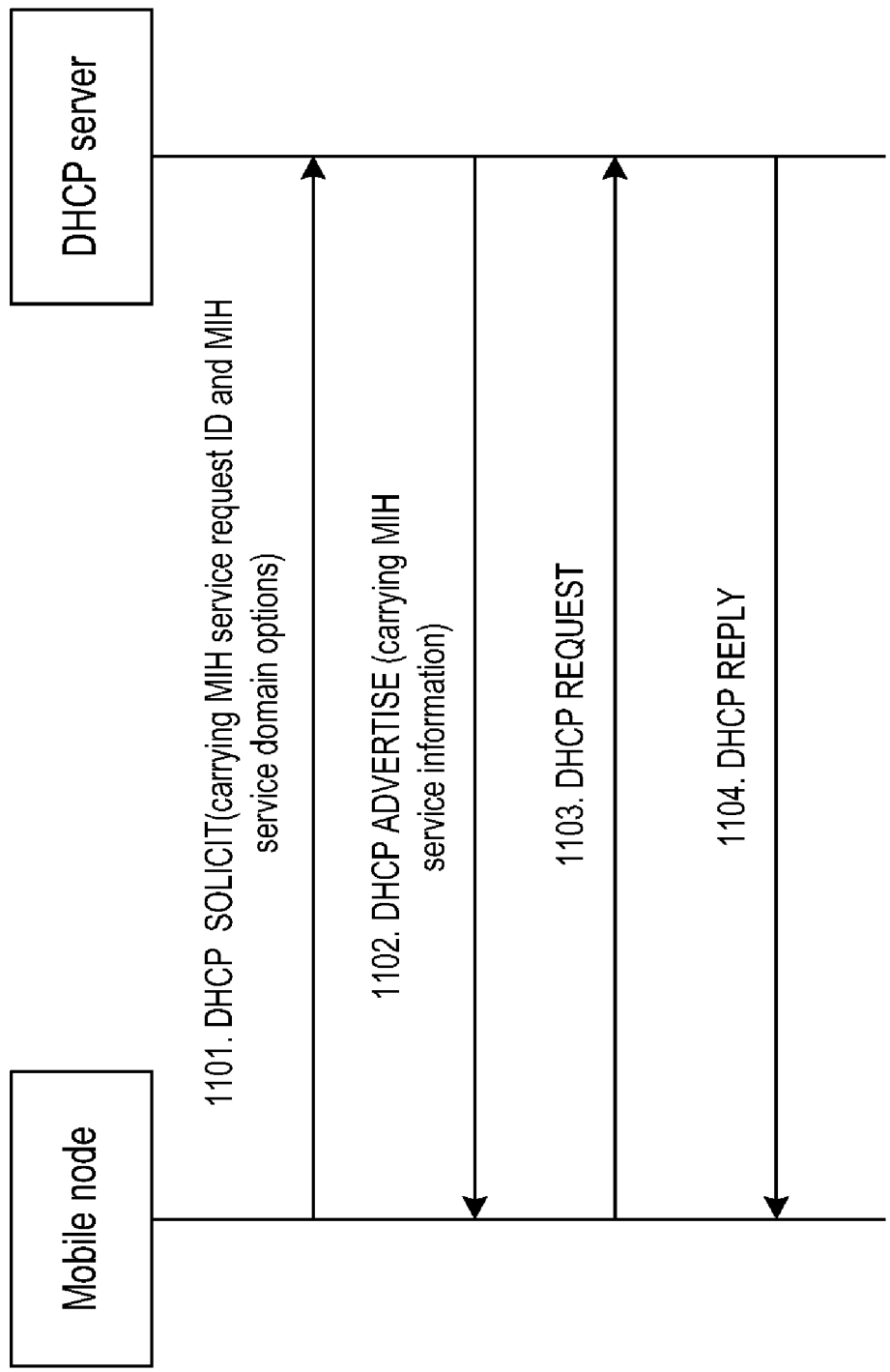
FIG. 11 is a flowchart of the method for obtaining MIH service information in the four-message switching mode according to an embodiment in DHCPv6.

The process of the method for obtaining MIH service information according to an embodiment can be implemented by extending the four-message switching mode supported by the DHCPv6. In an embodiment, an MIH service request flag can be added into the DHCP SOLICIT, and the MIH service information of the visited network can be added into the DHCP ADVERTISE. In another embodiment, the MIH service request flag and the MIH service domain options are added into the DHCP SOLICIT, and the MIH service information of the network selected by the MIH service domain options is added into the DHCP ADVERTISE, as illustrated in FIG. 10 and FIG. 11. The four messages—DHCP SOLICIT, DHCP ADVERTISE, DHCP REQUEST and DHCP RELY may pass through the NAS server/DHCP Relay, and the NAS server/DHCP Relay will insert the MIH service information of the mobile node's home network into the DHCP SOLICIT sent to the DHCP server; alternatively, the four messages do not pass through the NAS server/DHCP Relay, and the DHCP server will preset the MIH service information of the mobile node's home network. FIG. 10 is a flowchart of the method for obtaining MIH service information when the four messages pass through the NAS server/DHCP Relay in the four-message switching mode. FIG. 11 is a flowchart of the method for obtaining MIH service information when the four messages do not pass through the NAS server/DHCP Relay in the four-message switching mode.

As shown in FIG. 10, the method for obtaining MIH service information in the four-message switching mode includes the following described hereinafter.

1001: The mobile node sends a DHCP SOLICIT to the NAS server/DHCP Relay. The DHCP SOLICIT carries an MIH service request flag, an MIH service domain options and subscription ID.

1002: After receiving the DHCP SOLICIT, the NAS server/DHCP Relay inserts the MIH service information of the mobile node's home network into the message according to the subscription ID, renames the message to "DHCP SOLICIT in Relay", and sends the "DHCP SOLICIT in Relay" to the DHCP server.

1003: The DHCP server finds that the mobile node needs to obtain the MIH service information according to the MIH service request flag and the subscription ID, and hence retrieves the MIH service information of the network selected by the MIH service domain options and sends a response message "DHCP ADVERTISE in Relay" to the NAS server/DHCP Relay, with the MIH service information carried in the message.

1004: The NAS server/DHCP Relay sends a DHCP ADVERTISE to the mobile node, with the MIH service information carried in the message.

1005: The mobile node determines that the received MIH service information is available, and sends a DHCP REQUEST to the NAS server/DHCP Relay, notifying the received MIH service information is available.

1006: The NAS server/DHCP Relay sends a "DHCP REQUEST in Relay" message to the DHCP server, indicating that the received MIH service information is available.

1007: The DHCP server sends a "DHCP REPLY in Relay" response message to the NAS server/DHCP Relay.

1008: The NAS server/DHCP Relay sends a DHCP REPLY to the mobile node.

As shown in FIG. 11, the method for obtaining MIH service information in the four-message switching mode includes the following described hereinafter.

1101: The mobile node sends a DHCP SOLICIT to the DHCP server. The DHCP SOLICIT carries the MIH service request flag, the MIH service domain options and the subscription ID.

1102: The DHCP server finds that the mobile node needs to obtain the MIH service information according to the MIH service request flag and the subscription ID, and hence retrieves the MIH service information of the network selected by the MIH service domain options and sends a response message "DHCP ADVERTISE" to the mobile node, with the MIH service information carried in the message.

1103: The mobile node determines that the received MIH service information is available, and sends a DHCP REQUEST to the DHCP server, indicating that the received MIH service information is available.

1104: The DHCP server sends a DHCP REPLY to the mobile node.

In the previous embodiment, the MIH service request message sent by the DHCPv6 does not necessarily have a subscription ID; and the DHCP server may send the MIH service information of the visited network to the mobile node after receiving the MIH service information request message, which does not affect fulfillment of the purposes of the present disclosure.

The extension of the message in the DHCPv6 is elaborated below.

The DHCP REQUEST in 601 and 701; the DHCP SOLICIT in 801 and 901, and the DHCP SOLICIT in 1001 and 1101 are extended on the basis of the existing messages, and the MIH service request flag is added into such messages. For the specific extension mode, see the following illustration:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+-
|       OPTION_ORO              |         option-len            |
+-+-+-+-+-+-+-+-+-+-+-+-+-+-+-+-+-+-+-+-+-+-+-+-+-+-+-+-+-+-+-+-+-
|    MIH-option-code            |   requested-option-code-2     |
+-+-+-+-+-+-+-+-+-+-+-+-+-+-+-+-+-+-+-+-+-+-+-+-+-+-+-+-+-+-+-+-+-
|                              ...                              |
+-+-+-+-+-+-+-+-+-+-+-+-+-+-+-+-+-+-+-+-+-+-+-+-+-+-+-+-+-+-+-+-+-
``` where:
OPTION_ORO means: extension of the DHCPv6 Option Request Option;
option-len means: the length of the option;
MIH-option-code means: MIH service request flag;
requested-option-code-2 means: request flag of other services as required.

The DHCP REQUEST in 601 and 701 and the DHCP SOLICIT in 1001 and 1101 are further extended on the basis of the previous extension, and the MIH service domain options are added into the messages. For the specific extension mode, see the following illustration:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-
|      OPTION_MIH_Code      |         option-len         |
+-+-+-+-+-+-+-+-+-+-+-+-+-+-+-+-+-+-+-+-+-+-+-+-+-+-+-+-+-+-+-+-
.              sub-options                  .
+-+-+-+-+-+-+-+-+-+-+-+-+-+-+-+-+-+-+-+-+-+-+-+-+-+-+-+-+-+-+-+-
``` where:

OPTION_MIH_Code means: MIH service domain options;

sub-options means: sub-option information.

The program of the sub-option information is as follows:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+
| mih-x-code | sub-opt-len | id-type | ID |          |
+-+-+-+-+-+-+-+-+-+-+-+-+-+-+-+-+-+-+-+-+-+          +
.                                           .
.              mih service information      .
.                                           .
+-+-+-+-+-+-+-+-+-+-+-+-+-+-+-+-+-+-+-+-+-+-+-+-+-+-+-+-+-+-+-+
``` mih-x-code: 0 mih es 1 mih cs 2 mih is sub-opt-len: length of this option;

id-type: 0 local domain 1 home domain 2 the third party

ID:

XXX0: ip address

XXX1: domain name;

where:

mih-x-code means: service type code. The code "0" means MIH ES; the code "1" means MIH CS; and the code "2" means MIH IS;

sub-opt-len means: sub-option information length.

id-type means: service domain. The value "0" means visited network, "1" means home network, and "2" means a third-party network;

ID means: MIH service information, where the value "XXX0" means the IP address of the MIH service, "XXX1" means the MIH service domain name, and "XX0X" means the domain of the MIH service. The DHCP REQUEST in 601 and 701 and the DHCPSOLICIT in 1001 and 1101 are further extended on the basis of the previous extension, and the MIH relay agent information options are added into the messages. For the specific extension mode, see the following illustration:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+
|    OPTION_MIH-RELAY     |         option-len         |
+-+-+-+-+-+-+-+-+-+-+-+-+-+-+-+-+-+-+-+-+-+-+-+-+-+-+-+-+-+-+-+
.              sub-options                  .
+-+-+-+-+-+-+-+-+-+-+-+-+-+-+-+-+-+-+-+-+-+-+-+-+-+-+-+-+-+-+-+
``` where:

OPTION_MIH-RELAY means: MIH relay agent information option, namely, the MIH service information of the home network inserted by the NAS server/DHCP Relay in the previous embodiment.

Figure 12:
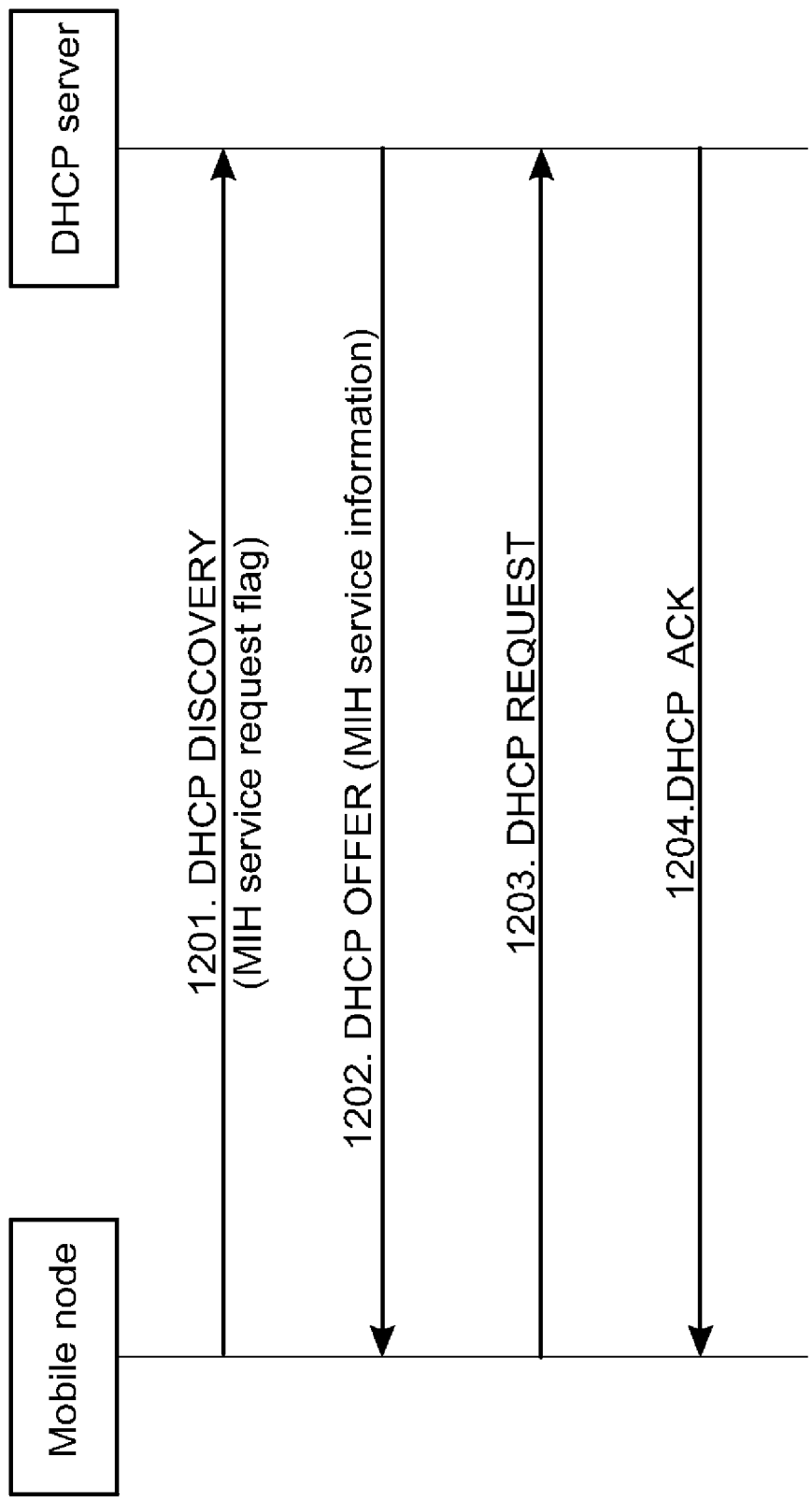
FIG. 12 is a flowchart of the method for obtaining MIH service information according to an embodiment in DHCPv4.

The present disclosure not only can be used in DHCPv6, but also can be used in DHCPv4. As shown in FIG. 12, an embodiment of the method for obtaining MIH service information in DHCPv4 the following described hereinafter.

1201: A mobile node sends a DHCP DISCOVERY to a DHCP server; requesting for the MIH service information.

In 1201, an MIH service request flag is set in the DHCP DISCOVERY indicating that the DHCP DISCOVERY requests for MIH service information. To carry the MIH service request flag, the Parameter Request List option of the DHCP DISCOVERY under the DHCPv4 should be extended to include a request option type, which indicates that the DHCP DISCOVERY requests for MIH service information. Following illustration shows an extended Parameter Request List option.

```
Code  Len   Option Codes
+-----+-----+-----+-----+-----+----
| 55  |  n  | c1  | c2  | MIH |.....
+-----+-----+-----+-----+
``` in which:

the field "Code" records the code of the Parameter Request List option to identify the Parameter Request List option, and contains 1 byte, has a value 55 predetermined by the system;

the field "Len" records the length of the whole Parameter Request List option, also has a length of contains 1 byte; and the field "Option Codes" records the contents of the Parameter Request List option, and includes one or more sub-fields. Each sub-field represents the service information type requested by the message. Each sub-field contains 1 byte. For example, the sub-field c1 means requesting for the IP address; the sub-field "c2" means requesting for the Domain Name Server (DNS); and the sub-field "MIH" is a new field which means the message requests for MIH service information. The values of such sub-fields indicated by the service type are determined according the convention of the system.

1202: The DHCP server obtains the MIH service information of the mobile node locally according to the MIH request flag in the DHCP DISCOVERY, and sends the obtained MIH service information to the mobile node through a DHCP OFFER.

In 1202, after receiving the DHCP DISCOVERY, the DHCP server determines that the mobile node requests for the MIH service information according to the MIH service request flag contained in the Parameter Request List option in the DHCP DISCOVERY; then the DHCP server obtains the MIH service information (for example, MIH ES information, MIH CS information or MIH IS information) of the mobile node from a local database; and sends the obtained MIH service information to the mobile node in a DHCP OFFER.

In the embodiment, the DHCP OFFER under the DHCPv4 protocol is extended to carry the obtained MIH service information. Specifically, the MIH information option type is added into the DHCP OFFER. This option is adapted to describe the requested MIH service information. The added MIH information option complies with the standard DHCPv4 option format. The MIH information option is shown in the following illustration:

```
       Code  Len  Option Codes
      +-----+-----+-----+-----+----+----+
      MIH | n | c1 | c2 | ... |cn |
      +-----+-----+-----+-----+----+----+----+
``` where:

the field "Code" records the code of the MIH information option to identify the MIH information option, and its value is determined according to the convention of the system;

the field "Len" records the length of the whole MIH information option;

the field "Option Codes" records the content of the MIH information option, and may include one or more sub-options such as c1, c2, and so on. The format of each sub-option is shown in the following illustration:

```
       SubOpt  Len   Sub-option Value
      +------+------+------+------+------+------+--...-+------+
      |code  | N| s1 | s2 | s3 | s4 |    | sN |
      +------+------+------+------+------+------+--...-+------+
``` where:

the field "SubOpt" represents the MIH service type, and can be set to any of the three values which represent the service type of MIH ES, MIH CS, and MIH IS, respectively;

the field "Len" records the length of the sub-option;

the field "Sub-option Value" is a value range of the sub-option, and is adapted to record the specific MIH service information, including one or more sub-fields. The format of each sub-field is shown in following illustration:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Position |Flag|r |  Name/Address of MIH Service  +
+-+-+-+-+-+-+-+-+-+-+-+-+-+-+-+-+-+-+-+-+-+-+-+-+-+-+-+-+-+-+-+-+
``` where:

Field "Position": indicates the location of the MIH service, and can be set to any of the following three values:

0: The MIH service belongs to the local domain of the visited network;

1: The MIH service belongs to the home network of the mobile node; and

2: The MIH service belongs to a third-party network;

Field "Flag": specifies the features of the subsequent MIH name and address (Name/Address) domain. In the DHCP OFFER, the "Flag" field can be set to the following values:

XX0X: The subsequent name and address field value is the domain name of the MIH service;

XX1X: The subsequent name and address field value is the address information of the MIH service;

XXX0: The subsequent name and address field value is the domain of the MIH service;

XXX1: The subsequent name and address field value is the address information of the MIH service;

Field "r": a reserved field; and

Field "Name/Address": indicates the name and address of an MIH service.

1203: The mobile node sends a DHCP REQUEST to the DHCP server to confirm the information provided by the DHCP server.

1204: The DHCP server returns a DHCP ACK to the mobile node in response to the DHCP REQUEST.

Figure 13:
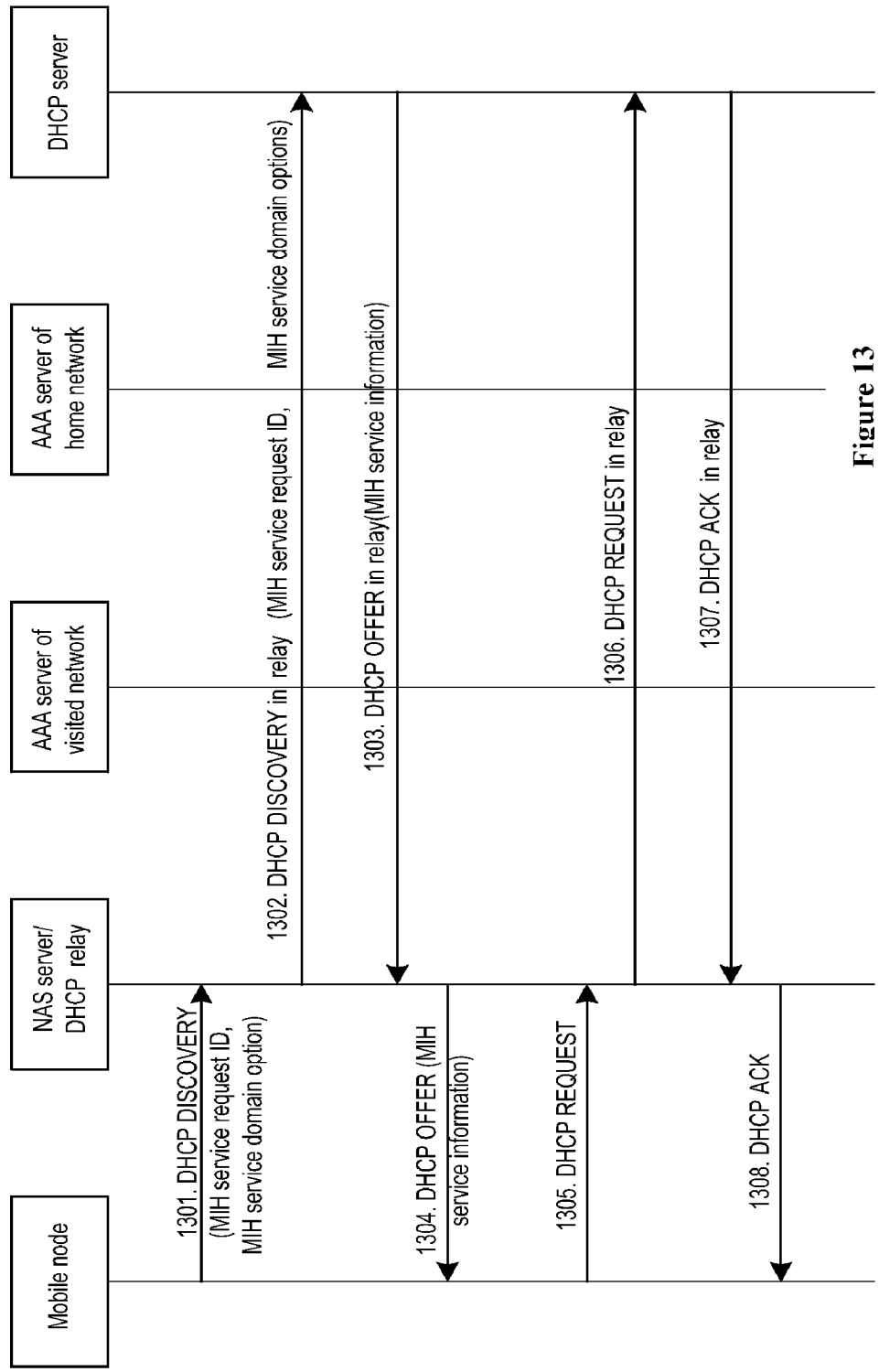
FIG. 13 is a flowchart of the method for obtaining MIH service information according to another embodiment in DHCPv4.

The present disclosure provides another embodiment, as shown in FIG. 13, an embodiment of the method for obtaining MIH service information in DHCPv4 the following described hereinafter.

1301: A mobile node sends a DHCP DISCOVERY to the NAS server/DHCP relay, requesting for the specified MIH service information. An MIH service request flag is set in the DHCP DISCOVERY, indicating that the message requests for MIH service information. This message also carries a domain option with a domain name to indicate that the message requests for the MIH service information of the specified domain. In the DHCP DISCOVERY, the Parameter Request List option is extended to include the request option type additionally, which indicates that the message requests for MIH service information.

Figure 15A:
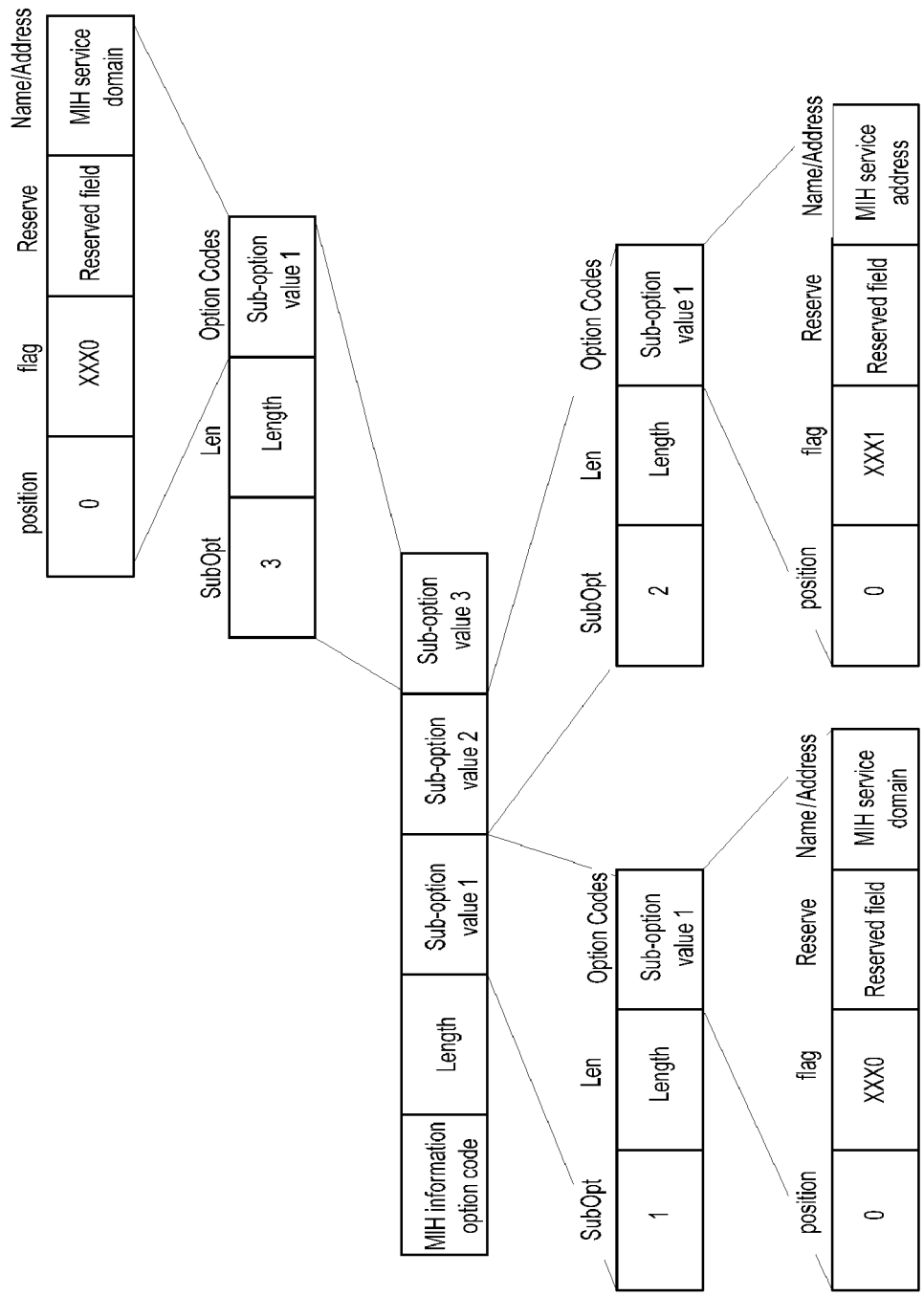
FIG. 15a and FIG. 15b show the MIH information options according to an embodiment in DHCPv4.

For example, if the mobile node needs to request for the MIH ES service information and MIH CS service information of the local domain of the visited network, the DHCP DISCOVERY sent by the mobile node will carry the Parameter Request List option and the MIH information option, wherein The MIH service request flag is added into the Parameter Request List option;

The MIH information option is shown in FIG. 15*a*. In FIG. 15*a*, the MIH information option includes three sub-options. Sub-option 1 consists of three fields, and the value "1" of the "SubOpt" field means that the MIH ES service information is requested. The value range of sub-option 1 consists of four fields: The value "0" of the "position" field means that the MIH service information of the local access network is requested; the "flag" field value together with the "Name/Address" indicates that the source domain of the requested MIH service information. Sub-option 2 consists of three fields, and the value "2" of the "SubOpt" field means that the MIH CS service information is requested. The value range of sub-option 2 consists of four fields: The value "0" of the "position" field means that the MIH service information of the local access network is requested; the "flag" field value together with the "Name/Address" indicates that the source address of the requested MIH service information. Sub-option 3 consists of three fields, and the value "3" of the "SubOpt" field means that the MIH IS service information is requested. The value range of sub-option 2 consists of four fields: The value "0" of the "position" field means that the MIH service information of the local access network is requested; the "flag" field value together with the "Name/Address" indicates that the source domain of the requested MIH service information.

Step 1302: The NAS server/DHCP relay sends a DHCP DISCOVERY in relay after receiving the DHCP DISCOVERY to the DHCP server through the R2 interface.

1303: The DHCP server obtains the corresponding MIH service information according to the DHCP DISCOVERY, and sends a DHCP OFFER in relay to the NAS server/DHCP relay, with the obtained MIH service information carried in the DHCP OFFER.

In 1303, after receiving the DHCP DISCOVERY, the DHCP server determines that the service requested by the mobile node is MIH service information according to the MIH service request flag included in the Parameter Request List option in the DHCP DISCOVERY, and reads the MIH information option. According to the "code" value of the sub-option in the MIH information option, the DHCP server determines the type(s) of MIH service information (for example, MIH ES, MIH CS and MIH IS services) to be obtained. According to the specific parameters of the sub-option, including the location value and the domain or address indicated by the flag, the DHCP server determines the domain of the MIH service or the MIH service address, and then obtains the MIH service information of the specified type from the corresponding domain or address.

The DHCP server returns the obtained MIH service information to the NAS server through a DHCP OFFER. In the previous embodiment, the DHCP Offer message under the DHCPv4 protocol is extended to carry the obtained MIH service information. Some MIH information options are added into the DHCP OFFER. The MIH information options are similar to the MIH information options carried in the DHCP DISCOVERY in terms of format. In the DHCP OFFER, the "Flag" field of the sub-option in the MIH information options can be set to the following values:

XXX0: The subsequent Name/Address field value indicates a domain name, namely, the domain of the obtained MIH service; and XXX1: The subsequent Name/Address field value indicates an address, namely, the IP address of the obtained MIH service.

Figure 15B:
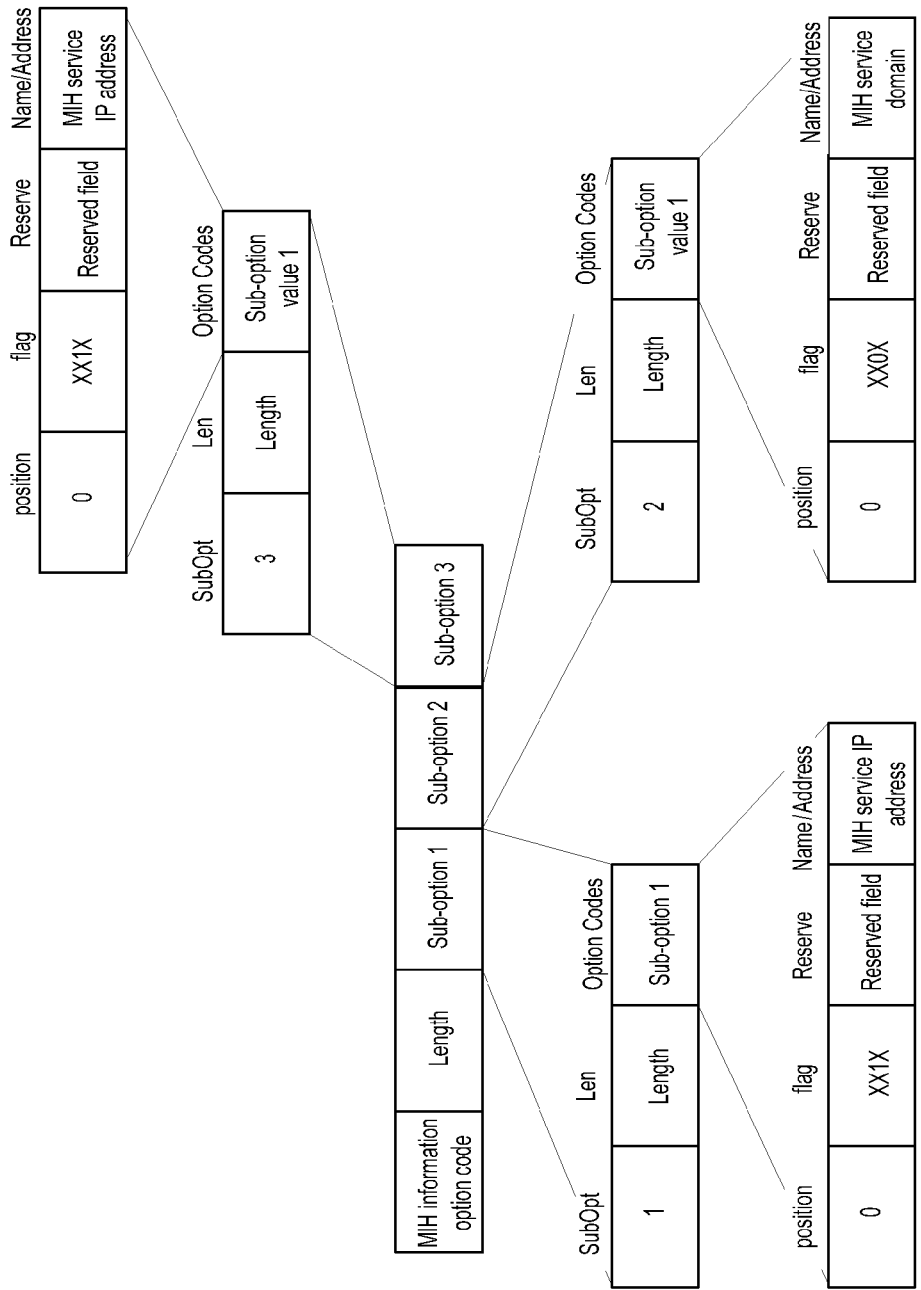

For example, if the mobile node needs to request for the MIH ES service information and MIH CS service information of the local domain of the access network, the DHCP server will set MIH information options in the returned DHCP OFFER after obtaining the IP address of the MIH ES service in the local domain of the visited network and the name of the domain of the MIH CS service. The MIH information options are used for carrying the obtained MIH service information and will be sent to the NAS server/DHCP relay. The MIH information options in the DHCP OFFER are shown in FIG. 15b. In FIG. 15b, the MIH information option includes three sub-options. Sub-option 1 consists of three fields, and the value "1" of the "SubOpt" field means that the MIH ES service information is obtained. The value range of sub-option 1 consists of four fields: The value "0" of the "position" field means that the MIH service information of the local access network is obtained; the "flag" field value together with the "Name/Address" indicates that the address of the MIH service is obtained. Sub-option 2 consists of three fields, and the value "2" of the "SubOpt" field means that the MIH CS service information is obtained. The value range of sub-option 2 consists of four fields: The value "0" of the "position" field means that the MIH service information of the visited network is obtained; the "flag" field value together with the "Name/Address" indicates that the domain of the MIH service is obtained. Sub-option 3 consists of three fields, and the value "3" of the "SubOpt" field means that the MIH IS service information is obtained. The value range of sub-option 2 consists of four fields: The value "0" of the "position" field means that the MIH service information of the local access network is obtained; the "flag" field value together with the "Name/Address" indicates that the address of the MIH service is obtained.

1304: The NAS server/DHCP relay sends a DHCP OFFER to the mobile node. The DHCP OFFER carries the obtained MIH service information through the MIH information options.

1305~1306: The mobile node sends a DHCP REQUEST to the DHCP server through the NAS server/DHCP relay to confirm the information provided by the DHCP server.

1307~1308: Through the NAS server/DHCP relay, the DHCP server returns a DHCP ACK to the mobile node in response to the DHCP REQUEST.

Figure 14:
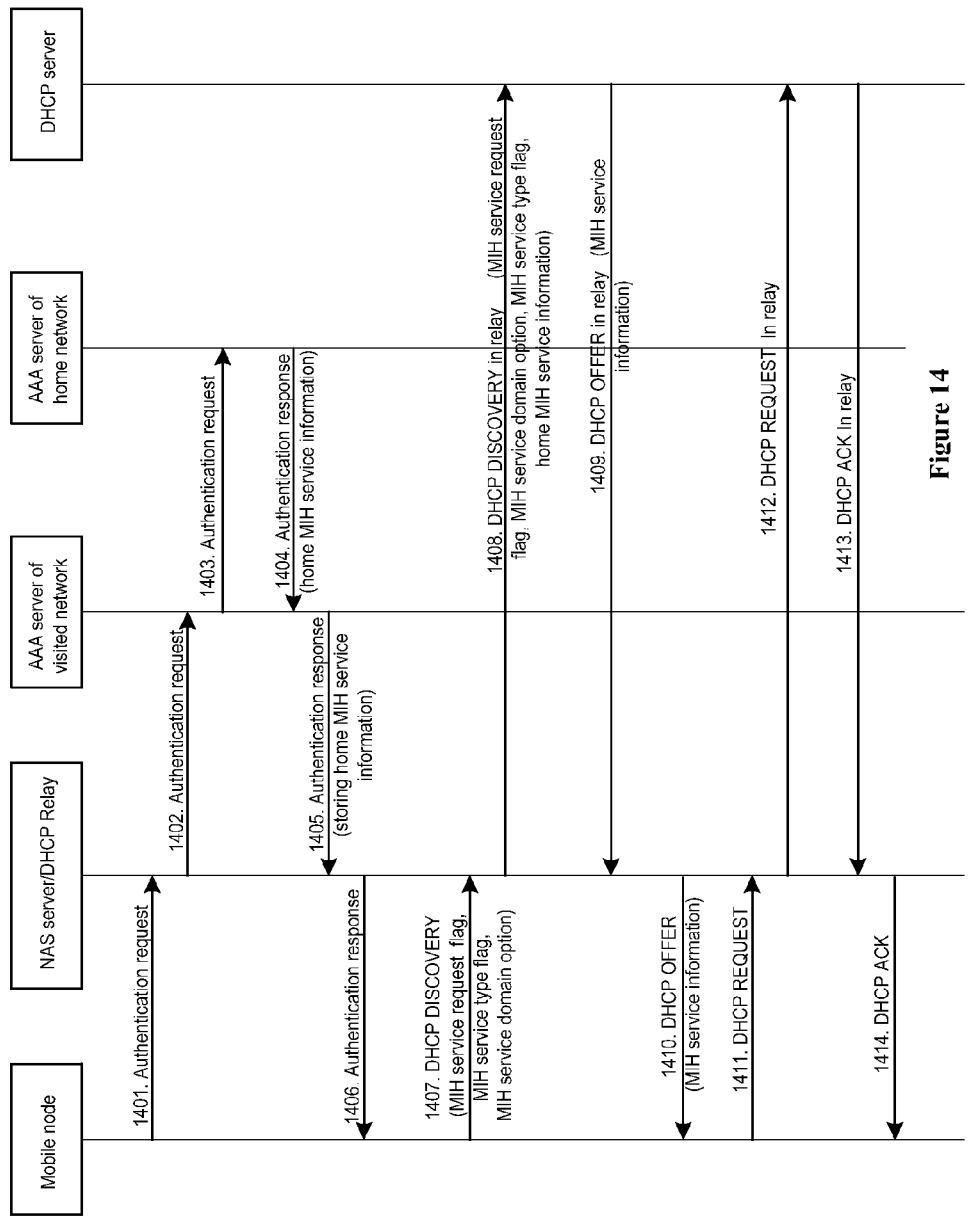
FIG. 14 is a flowchart of the method for obtaining MIH service information according to another embodiment in DHCPv4.

In another embodiment, the process for the mobile node to obtaining MIH service information is divided into two stages: (i) Access authentication of the mobile node, during which the DHCP Relay needs to store the home MIH service information of the mobile node; and (ii) obtaining MIH service information, which is illustrated in FIG. 14. The process of discovering MIH services automatically includes the following described hereinafter.

1401: The mobile node sends an authentication request to the NAS server/DHCP relay of the visited network.

1402: The NAS server/DHCP server of the visited network sends the authentication request to the AAA server of the visited network.

1403: The AAA server of the access network sends the authentication request to the AAA server of the home network of the mobile node.

Step 1404: The AAA server of the home network authenticates the mobile node, and returns an Authentication response to the AAA server of the visited network of the mobile node. If the authentication succeeds, the AAA server of the home network will obtain the home MIH service information from the MIH server in the home network of the mobile node, and carry the obtained home MIH service information in the Authentication response, which will be sent to AAA server of the visited network.

1405: The AAA server of the visited network sends the Authentication response to the NAS server/DHCP relay, with the home MIH service information of the mobile node carried in the Authentication response. The NAS server/DHCP Relay stores the home MIH service information of the mobile node.

1406: The NAS server/DHCP relay sends the Authentication response to the mobile node, not necessarily carrying the home MIH service information of the mobile node.

1407: After receiving the Authentication response, the mobile node sends a DHCP DISCOVERY to the NAS server/DHCP relay requesting for the specified MIH service information.

In the embodiment, an MIH service request flag is set in the DHCP DISCOVERY, indicating that the message requests for MIH service information. The DHCP DISCOVERY also carries an MIH service domain option and an MIH service type flag to indicate that the DHCP DISCOVERY requests for the MIH service information of the specified domain of specified type. In the embodiment, the DHCP DISCOVERY under the DHCPv4 protocol is extended to carry the MIH service request flag and the source domain name of the specified MIH service information.

If the mobile node needs to request for the MIH ES service information and MIH CS service information of the home network, the DHCP DISCOVERY sent by the mobile node will carry the Parameter Request List option and the MIH information option, wherein The MIH service request flag is added into the Parameter Request List option.

The MIH information option is shown in FIG. 16a. In FIG. 16a, the MIH information option includes three sub-options. Sub-option 1 consists of three fields, and the value "1" of the "SubOpt" field means that the MIH ES service information is requested. The value range of sub-option 1 consists of four fields: The value "1" of the "position" field means that the MIH service information of the home network is requested; the "flag" field value together with the "Name/Address" indicates that the source domain of the requested MIH service information. Sub-option 2 consists of three fields, and the value "2" of the "SubOpt" field means that the MIH CS service information is requested. The value range of sub-option 2 consists of four fields: The value "1" of the "position" field means that the MIH service information of the home network is requested; the "flag" field value together with the "Name/Address" indicates that the source address of the requested MIH service information. Sub-option 3 consists of three fields, and the value "3" of the "SubOpt" field means that the MIH IS service information is requested. The value range of sub-option 2 consists of four fields: The value "1" of the "position" field means that the MIH service information of the home network is requested; the "flag" field value together with the "Name/Address" indicates that the source domain of the requested MIH service information.

1408: The DHCP Relay inserts the stored home MIH service information of the mobile node into the DHCP DISCOVERY, and sends the DHCP DISCOVERY to the DHCP server.

In this embodiment, the DHCP Relay inserts the stored home MIH service information of the mobile node into the MIH information options of the DHCP DISCOVERY, namely, adds the corresponding sub-option into the MIH information option, for the purpose of carrying the home MIH service information of the mobile node.

For example, if the address information of the home MIH ES and MIH CS service of the mobile node is stored in the DHCP Relay, the DHCP Relay will add two sub-options into the MIH information option in the DHCP DISCOVERY. The two sub-options carry the information about the addresses of the home MIH ES and CS services of the mobile node respectively. The MIH information options are shown in FIG. 16*b*, in which sub-options 3, 4 and 5 are new sub-options; sub-option 3 is adapted to carry the MIH ES service address information; sub-option 4 is adapted to carry the MIH CS service address information; and sub-option 5 is adapted to carry the MIH IS service address information.

1409: The DHCP server obtains the corresponding MIH service information according to the DHCP DISCOVERY, and sends a DHCP OFFER in relay to the NAS server/DHCP relay, with the obtained MIH service information carried.

If the DHCP server determines that the MIH service information requested by the mobile node is the local MIH service information of the visited network or the MIH service information of a third-party network according to the DHCP DISCOVERY, the DHCP server will obtain the corresponding MIH service information, and send a DHCP OFFER. The MIH information options are set in the DHCP OFFER for carrying the obtained MIH service information.

If the DHCP server determines that the MIH service information requested by the mobile node is the MIH service information of the home network according to the DHCP DISCOVERY, the DHCP server will obtain the home MIH service information of the mobile node from the DHCP DISCOVERY itself, set the MIH information options, carry the obtained home MIH service information into the MIH information options, and send a DHCP OFFER which carries the set MIH information options. The MIH information options in the DHCP OFFER are shown in FIG. 16*c*. In FIG. 16*c*, the MIH information options include three sub-options: sub-option 1 carries the information about the address of the home MIH ES service; sub-option 2 carries the information about the address of the home MIH CS service; and sub-option 3 carries the information about the address of the home MIH IS service.

1410: The NAS server/DHCP relay sends a DHCP OFFER to the mobile node after receiving the DHCP OFFER in relay. The DHCP OFFER carries the MIH service information requested by the mobile node.

1411~1412: The mobile node sends a DHCP REQUEST to the DHCP server through the NAS server/DHCP relay to confirm the information provided by the DHCP server.

1413~1414: Through the NAS server/DHCP relay, the DHCP server returns a DHCP ACK to the mobile node in response to the DHCP REQUEST.

The mode of extending the message format illustrated in the embodiments is just examples, and other extension modes are applicable.

A person have ordinary skill in the art may understand that all or part of the processes in the preceding embodiments can be completed through a program which instructs related hardware. The program may be stored in a readable storage medium, for example, ROM/RAM, disk and CD in a computer.

The preceding methods can be implemented in the network system as show in FIG. 17. The system includes:

a mobile node 1701 and a DHCP server 1702 of the visited network, wherein the DHCP server 1702 of the visited network being adapted to receive the MIH service information request message sent by the mobile node 1701, obtain the MIH service information requested by the mobile node 1701, and send obtained MIH service information to the mobile node 1701;

In an embodiment, the DHCP server 1702 obtains the MIH service information requested by the mobile node 1701 according to an MIH service request flag in the MIH service information request message. The MIH service information request message further includes MIH service domain options and a subscription ID.

The system further includes a relay server 1703 is adapted to: receive the MIH service information request message sent by the mobile node 1701; insert the MIH service information of the home network of the mobile node into the MIH service information request message according to the subscription ID in the MIH service information request message; and send the message to the DHCP server 1702 of the visited network;

the DHCP server 1702 of the visited network is also adapted to: receive the MIH service formation request message that contains the MIH service information of the home network of the mobile node; obtain the MIH service information of the network selected by the MIH service domain options according to the subscription ID and MIH service domain options in the MIH service information request message; and send the obtained MIH service information of the selected network to the mobile node 1701;

the MIH service information of the network selected by the MIH service domain options may be: the MIH service information of the home network of the mobile node; the MIH service information of the visited network, or the MIH service information of a third-party network.

the system further includes an AAA server 1705 of the home network and an MA server 1704 of the visited network, wherein:

the AAA server 1705 of the home network is adapted to: receive an authentication request that carries the subscription ID from the AAA server 1704 of the visited network; obtain the MIH service information of the home network of the mobile node from the DHCP server 1706 of the home network according to the subscription ID; and send an authentication response that carries the MIH service information of the home network of the mobile node to the AAA server 1704 of the visited network;

the AAA server 1704 of the visited network is adapted to: receive the authentication request that carries the subscription ID; send the authentication request to the AAA server 1705 of the home network; receive the authentication response that carries the MIH service information of the home network of the mobile node; and send the authentication response to the relay server 1703; and the relay server 1703 is further used to obtain and store the MIH service information of the home network of the mobile node from the received authentication response, and send a authentication response to the mobile node.

In the embodiment, the DHCP server 1702 and DHCP server 1706 may be DHCPv4 servers or DHCPv6 servers.

The architecture of a DHCP server according to an embodiment. The DHCP server may be a DHCPv4 server or a DHCPv6 server, includes a request receiving module 1801, an information obtaining module 1802 and an information sending module 1803, wherein:

the request receiving module 1801 is adapted to receive an MIH service information request message sent by a mobile node, wherein the MIH service information request message carries an MIH service request flag;

the information obtaining module 1802 is adapted to obtain MIH service information according to the MIH service request flag; and the information sending module 1803 is adapted to send the obtained MIH service information to the mobile node in a response message.

The MIH service information request message may also includes an MIH service domain option and an MIH type code. The MIH service domain option indicates the domain of the requested MIH service information; the domain may be a visited network, a home network, or a third-party network. Accordingly, the request receiving module 1801 includes two sub-module: message receiving sub-module and resolving sub-module, wherein the message receiving sub-module is adapted to receive the MIH service information request message and the resolving sub-module is configured to resolve the received message. The information obtaining module 1802 includes the following three sub-modules which obtain MIH service information from different domains: a first information obtaining sub-module, adapted to obtain the MIH service information in the visited network of the mobile node according to the MIH service domain option, wherein the first information obtaining sub-module may need to interact with a AAA server in the visited network, and obtain the MIH service information from an MIH server in the visited network; a second information obtaining sub-module, adapted to obtain the MIH service information in the home network of the mobile node according to the MIH service domain option, wherein the second information obtaining sub-module may need to interact with the AAA server in the home network, and obtain the MIH service information from an MIH server in the home network; and a third information obtaining sub-module, adapted to obtain the MIH service information in a third-party network of the mobile node according to the MIH service domain option, wherein the third obtaining sub-module can obtain the MIH service information of the third-party network from a local database of the DHCP server.

The information sending module 1803 includes a setting sub-module and a message sending sub-module, wherein:

the setting sub-module is adapted to set the obtained MIH service information into a response message; and the message sending sub-module is adapted to send the response to the mobile node.

In the various embodiments, by extending the format of the relevant messages under the DHCPv4 protocol or the DHCPv6 protocol, a DHCP server obtain MIH service information requested by a mobile node after receiving an MIH service information request message from the mobile node; and the DHCP server send the obtained MIH service information to the mobile node, so that the mobile node can dynamically obtain the MIH service information specified after the mobile node roams to a visited network. The obtained MIH service information may includes the MIH service information of the network visited by the mobile node. The mobile node can get MIN service information flexibly, for example, the mobile can get the MIH CS and the MIH ES information of the visited network, and the MIH information of the home network. This helps seamless handover of a mobile node between networks of the same or different types.

The embodiments can obtain MIH service information dynamically without configuring MIH service-related information manually, thus avoiding the heavy work involved in manual configuration of the MIH service-related information.

Although the disclosure has been described through some exemplary embodiments, the disclosure is not limited to such embodiments. It is apparent that those skilled in the art can make various modifications and variations without departing from the spirit and scope of the present disclosure. The present disclosure is intended to cover these modifications and variations provided that they fall in the scope of protection defined by the following claims or their equivalents.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for obtaining media independent handover, MIH, service information, comprising:

receiving, by a DHCP server, an MIH service information request message from a mobile node, wherein the MIH service information request message carrying an MIH service request flag and an MIH service domain option indicating a network;

obtaining, by the DHCP server, an MIH service information of the network indicated by the MIH domain option according to the MIH service request flag;

sending, by the DHCP server, a response message to the mobile node, wherein the response message carrying the obtained MIH service information.

2. The method according to claim 1, wherein:

when the domain indicated by the domain option is the domain of the MIH service in a visited network, the MIH service information comprises the MIH service domain name or IP address of the MIH service in the visited network;

when the domain indicated by the domain option is the domain of the MIH service in a home network, the MIH service information comprises the MIH service domain name or IP address of the MIH service in the home network; or when the domain indicated by the domain option is the domain of the MIH service in a third-party network, the MIH service information comprises the MIH service domain name or IP address of the MIH service in the third-party network.

3. The method according to claim 2, wherein the MIH service information request message further comprises an MIH service type flag, wherein the obtaining of the MIH service information comprises:

obtaining the MIH service information of the network indicated by the MIH service domain option according to the MIH service request flag, the domain indicated by the domain option and a type indicated by the MIH service type flag.

4. The method according to claim 3, wherein the MIH service type indicated by the MIH service type flag is: an MIH event service, an MIH command service or an MIH information service.

5. The method according to claim 1, wherein the MIH service information request message is a DHCP DISCOVERY; the response message is a DHCP OFFER.

6. The method according to claim 5, wherein the DHCP DISCOVERY is sent via a DHCP relay and after the DHCP relay receiving the DHCP DISCOVERY, the DHCP relay inserts a home MIH service information of the mobile into the DHCP DISCOVERY.

7. The method according to claim 6, wherein before the mobile node sending the MIH service information request message, the method further comprises:

sending, by the mobile node, an authentication request to an Authentication Authorization and Accounting (AAA) server through the DHCP relay;

returning, by the AAA server, an authentication response message with a home MIH service information to the DHCP relay after authenticating the mobile node successfully; and returning, by the DHCP relay, an authentication response to the mobile node.

8. The method according to claim 7, wherein the receiving an MIH service information request message from a mobile node comprises:

receiving, by the DHCP server, the MIH service information request message from the DHCP relay after the DHCP relay receives an MIH service information request message from the mobile node and inserts the MIH service information of the home network of the mobile node into the MIH service information request message.

9. The method according to claim 1, wherein the MIH service information request message is a DHCP SOLICIT with Rapid Commit Option; the response message is a DHCP REPLY.

10. The method according to claim 1, wherein the MIH service information request message is a DHCP REQUEST; the response message is a DHCP REPLY;

wherein the DHCP REQUEST further comprises an MIH service domain option, the DHCP server obtains the MIH service information of the domain indicated by the domain option.

11. The method according to claim 1, wherein the MIH service information request message is a DHCP SOLICIT; the response message is a DHCP ADVERTISE.

12. A non-transitory computer readable medium having thereon computer readable instructions, which, when executed by a computer unit, will cause the computer to perform the following:

receiving an MIH service information request message from a mobile node, wherein the MIH service information request message carrying an MIH service request flag and an MIH service domain option indicating a network;

obtaining an MIH service information of the network indicated by the MIH domain option according to the MIH service request flag;

sending a response message to the mobile node, wherein the response message carrying the obtained MIH service information.

13. An apparatus for obtaining media independent handover, MIH, services information, the apparatus is capable of communicating with a mobile node, the apparatus comprising:

a request receiving module adapted to receive, from the mobile node, an MIH service information request message with an MIH service request flag and an MIH service domain option indicating a network;

an information obtaining module adapted to obtain, the MIH service information of the network indicated by the MIH domain option requested by the mobile node according to the MIH service request flag; and an information sending module adapted to send, a response message with the obtained MIH service information to the mobile node;

wherein the apparatus is a DHCPv4 server or a DHCPv6 server.

14. The apparatus according to claim 13, wherein the request receiving module further comprises:

a message receiving sub-module, adapted to receive the MIH service information request message; and a resolving sub-module, adapted to resolve the MIH service information request message received by the message receiving sub-module.

15. The apparatus according to claim 13, wherein the information obtaining module further comprises:

a first information obtaining sub-module, adapted to obtain the MIH service information in a visited network;

a second information obtaining sub-module, adapted to obtain the MIH service information in the home network; and a third information obtaining sub-module, adapted to obtain the MIH service information in a third-party network.

16. The apparatus according to claim 13, wherein the information sending module further comprises:

a setting sub-module, adapted to set the obtained MIH service information into a response message; and a message sending sub-module, adapted to send the response to the mobile node.

17. A system for obtaining media independent handover, MIH, service information, the system comprising:

a mobile node is configured to send an MIH service information request message with an MIH service request flag and an MIH service domain option indicating a network to a DHCP server, and receive a response message from the DHCP server;

wherein the DHCP server is configured to receive the MIH service information request message, obtain an MIH service information of the network indicated by the MIH domain option according to the MIH service request flag, and send the obtained MIH service information to the mobile node in the response message.

18. The system according to claim 17, wherein the DHCP server is in a visited network of the mobile node.

19. The system according to claim 17, wherein the system further comprises a relay server adapted to receive the MIH service information request message sent by the mobile node, insert the MIH service information of the home network of the mobile node into the MIH service information request message and send the MIH service information request message to DHCP server.

\* \* \* \* \*